United States Patent
Cao et al.

(10) Patent No.: US 12,544,690 B2
(45) Date of Patent: Feb. 10, 2026

(54) AUTOMATIC SEPARATION APPARATUS FOR FOUR FRACTIONS OF HEAVY OIL AND SEPARATION METHOD THEREOF

(71) Applicants: PETROCHINA COMPANY LIMITED, Beijing (CN); BEIJING ORIENDA INSTRUMENTS CO., LTD., Beijing (CN)

(72) Inventors: Qing Cao, Beijing (CN); Dawei Wen, Beijing (CN); Shengbao He, Beijing (CN); Yuan Xiu, Beijing (CN); Lin Tian, Beijing (CN); Dingzhong Yang, Beijing (CN); Jing He, Beijing (CN); Minna Dou, Beijing (CN); Fei Chen, Beijing (CN); Kunhong Liu, Beijing (CN); Chenchen Li, Beijing (CN); Huifeng Xue, Beijing (CN); Jianming Wang, Beijing (CN)

(73) Assignees: PETROCHINA COMPANY LIMITED, Beijing (CN); BEIJING ORIENDA INSTRUMENTS CO., LTD, Beijing (CN)

( * ) Notice: Subject to any disclaimer, the term of this patent is extended or adjusted under 35 U.S.C. 154(b) by 619 days.

(21) Appl. No.: 17/772,367

(22) PCT Filed: Oct. 26, 2020

(86) PCT No.: PCT/CN2020/123532
§ 371 (c)(1),
(2) Date: Apr. 27, 2022

(87) PCT Pub. No.: WO2021/083066
PCT Pub. Date: May 6, 2021

(65) Prior Publication Data
US 2023/0001327 A1 Jan. 5, 2023

(30) Foreign Application Priority Data

Oct. 28, 2019 (CN) .......................... 201911032551.5
Oct. 28, 2019 (CN) .......................... 201911033491.9
(Continued)

(51) Int. Cl.
*B01D 15/00* (2006.01)
*B01D 15/12* (2006.01)
(Continued)

(52) U.S. Cl.
CPC ........... *B01D 15/18* (2013.01); *B01D 15/125* (2013.01); *B01D 15/426* (2013.01); *B01D 63/08* (2013.01);
(Continued)

(58) Field of Classification Search
CPC ........ G01N 30/06; G01N 30/88; G01N 30/38; G01N 2030/8854; G01N 2030/027;
(Continued)

(56) References Cited

U.S. PATENT DOCUMENTS

| 4,988,446 A | 1/1991 | Haberman | |
| 10,451,591 B1 * | 10/2019 | Gebauer | .................. F16K 7/07 |

(Continued)

FOREIGN PATENT DOCUMENTS

| CA | 2313990 C * | 11/2004 | .......... C10G 11/187 |
| CN | 102527088 A | 7/2012 | |

(Continued)

OTHER PUBLICATIONS

International Search Report, Application No. PCT/CN2020/123532 mailed Jan. 27, 2021.
(Continued)

*Primary Examiner* — Prem C Singh
*Assistant Examiner* — Brandi M Doyle
(74) *Attorney, Agent, or Firm* — The Dobrusin Law Firm, P.C.; Daniela M. Thompson-Walters

(57) ABSTRACT

The present disclosure provides an automatic separation apparatus for four fractions of heavy oil and a separation method thereof, wherein the apparatus includes a solvent reservoir tank (1), a separation unit for four fractions of heavy oil (100) and a receiving apparatus (9). The separation unit for four fractions of heavy oil (100) includes: a filter disc (4) having one end in communication with the solvent reservoir tank (1), and the other end in communication with an inlet of a pre-column flow path switching valve (5); a chromatographic column (6) having an inlet in communication with an outlet of the pre-column flow path switching valve (5), and an outlet in communication with an inlet of a post-column flow path switching valve (8). The receiving apparatus is in communication with an outlet of the post-column flow path switching valve (8).

18 Claims, 6 Drawing Sheets

(30) Foreign Application Priority Data

| | | |
|---|---|---|
| Mar. 2, 2020 | (CN) | 202010136495.6 |
| Mar. 2, 2020 | (CN) | 202010137663.3 |

(51) Int. Cl.

| | |
|---|---|
| *B01D 15/18* | (2006.01) |
| *B01D 15/42* | (2006.01) |
| *B01D 63/08* | (2006.01) |
| *B01D 69/02* | (2006.01) |
| *B01J 20/08* | (2006.01) |
| *B01J 20/28* | (2006.01) |
| *C10G 25/00* | (2006.01) |
| *G01N 30/06* | (2006.01) |
| *G01N 30/38* | (2006.01) |
| *G01N 30/02* | (2006.01) |

(52) U.S. Cl.
CPC .............. *B01D 69/02* (2013.01); *B01J 20/08* (2013.01); *B01J 20/28004* (2013.01); *B01J 20/28007* (2013.01); *B01J 20/28061* (2013.01); *B01J 20/28071* (2013.01); *C10G 25/003* (2013.01); *G01N 30/06* (2013.01); *G01N 30/38* (2013.01); *B01D 2325/0283* (2022.08); *B01D 2325/02834* (2022.08); *B01J 2220/52* (2013.01); *G01N 2030/027* (2013.01)

(58) Field of Classification Search
CPC .... B01D 15/125; B01D 15/18; B01D 15/426; B01D 63/08; B01D 69/02; B01D 2325/0283; B01D 2325/02834; B01J 20/28061; B01J 20/28007; B01J 20/08; B01J 20/28071; B01J 20/28004; B01J 20/284; B01J 2220/52; C10G 25/00; C10G 25/003; C10G 53/04; C10G 53/08; C10G 31/09

See application file for complete search history.

(56) References Cited

U.S. PATENT DOCUMENTS

| | | |
|---|---|---|
| 2017/0088781 A1 | 3/2017 | Sano et al. |
| 2019/0256782 A1 | 8/2019 | Shelton, Jr. et al. |
| 2023/0001327 A1 | 1/2023 | Cao et al. |

FOREIGN PATENT DOCUMENTS

| | | |
|---|---|---|
| CN | 102940977 A | 2/2013 |
| CN | 204241297 U | 4/2015 |
| CN | 206089581 U | 4/2017 |
| CN | 107271580 A | 10/2017 |
| CN | 207366580 U | 5/2018 |
| CN | 108318606 A | 7/2018 |
| CN | 108384567 A | 8/2018 |
| CN | 109423332 A | 3/2019 |
| CN | 109632989 A | 4/2019 |
| CN | 212275681 U | 1/2021 |
| CN | 112730636 A | 4/2021 |
| CN | 112730700 A | 4/2021 |
| CN | 110121544 B | 4/2022 |
| EP | 4053249 A1 | 9/2022 |
| WO | 2021083066 A1 | 5/2021 |

OTHER PUBLICATIONS

First Office Action issued on Aug. 18, 2021, Chinese Application No. 202010136495.6.
Second Office Action dated Jan. 28, 2022, Chinese Application No. 202010136495.6.
NB/SH/T 0509-2010, Determination of Petroleum Asphalt Components.
Ken Soodhoo & Colin R. Phillips, Non-catalytic hydrocracking of asphaltenes, FUEL, IPC Science & Technology Press, vol. 67, No. 3, 1 Mar. 1, 1988, pp. 361-374.
Extended European Search Report dated Oct. 19, 2023, for counterpart European Patent Application No. 20883001.8.
Canadian Office Action dated Mar. 9, 2023, Application No. CN2020123532.
The First Office Action and Search Report issued on Oct. 29, 2024, for counterpart Chinese patent application No. 202010137663.3, along with machine EN translation downloaded from EPO.

\* cited by examiner

AUTOMATIC SEPARATION APPARATUS FOR FOUR FRACTIONS OF HEAVY OIL AND SEPARATION METHOD THEREOF

RELATED APPLICATIONS

This application is a National Stage of International Application No. PCT/CN2020/123532, filed Oct. 26, 2020, which claims priorities of Chinese Patent Application No. 201911032551.5, filed on Oct. 28, 2019, entitled "AUTOMATIC SEPARATION APPARATUS FOR FOUR FRACTIONS OF HEAVY OIL", Chinese Patent Application No. 201911033491.9, filed on Oct. 28, 2019, entitled "SEPARATION METHOD FOR FOUR FRACTIONS OF HEAVY OIL", Chinese Patent Application No. 202010136495.6, filed on Mar. 2, 2020, entitled "SEPARATION METHOD FOR FOUR FRACTIONS OF HEAVY OIL" and Chinese Patent Application No. 202010137663.3, filed on Mar. 2, 2020, entitled "AUTOMATIC SEPARATION APPARATUS FOR FOUR FRACTIONS OF HEAVY OIL", all of which are hereby incorporated by reference in their entirety.

TECHNICAL FIELD

The present disclosure relates to the technical field of separation of four fractions of heavy oil, in particular to an automatic separation apparatus for four fractions of heavy oil and separation method thereof.

BACKGROUND

Four fractions of heavy oil are one of the important physical and chemical properties of asphalt and heavy oil. Samples are separated into asphaltenes, saturates, aromatics and resins, mass percentages of which are measured respectively.

At present, NB/SH/T 0509-2010 "TEST METHOD FOR SEPARATION OF ASPHALT INTO FOUR FRACTIONS" is applied in petrochemical field in China for measuring the four fractions of heavy oil. Major steps of this standard method includes: (1) Preparation of packing materials of alumina chromatography column. it is necessary to activate commercially available alumina at 500° C. for 6 h, then add 1% mass of water, shake vigorously and let it stand for 24 h. The stationary phase is valid for one week. (2) Separation of asphaltenes. The samples need to be heated and refluxed in n-heptane for 0.5 h-1 h, settle for 1 h and then filtered. The container needs to be washed with hot n-heptane several times, then the filter paper with precipitate needs to be refluxed and extracted with n-heptane for 1 h and then with toluene for 1 h, finally the toluene extracts are dried by evaporation to a constant weight for obtaining the content of asphaltenes. (3) Packing of chromatography column: the alumina prepared in step (1) needs to be added to a glass adsorption column tube. Gently tap continuously to form a tightly packed column. (4) Separation of saturates, aromatics and resins. Pre-wet the column with n-heptane, then solutions without asphaltenes obtained in step (2) are loaded therein. Elute the column with n-heptane, toluene, toluene-ethanol respectively to obtain the saturates, aromatics and resins. (5) Weigh each fraction. The solution of each fraction obtained in step (4) has to be distilled by distillation apparatus firstly to remove most of the solvent, placed in a vacuum oven for 1 h and then removed therefrom, cooled and weighed.

This standard mainly has following problems in current applications. (1) Steps are cumbersome, the operator is labor-intensive, and the time for analysis is too long (two days for one sample). (2) In order to ensure an accuracy of the data, one sample needs to be measured twice in parallel. The steps in above standard method are tedious, the required experimental equipment covers a large area, and it requires a floor-standing fume hood, which makes it difficult to analyze multi-path and multiple samples at the same time. (3) Since the preparation and packing of alumina are performed manually, the properties of alumina packing materials obtained in various laboratories have large difference and short valid time, and the packing thereof is not tight enough, which will affect the separation effect. (4) The column separation process is pressurized by the gravity and duplex ball, and the elution speed is slow and uncontrollable, which affect repeatability of separation. (5) The glass conical flasks of 150 mL-250 mL are used when the asphaltenes are refluxed and the other three fractions are received. The mass of the container itself exceeds 100 g, and the mass of each fraction after drying is less than 1 g, even less than 0.1 g, such that the weighing error caused by the mass of the container is relatively large. (6) It requires about 500 mL n-heptane, toluene and other volatile organic solvents to process each sample, which bring many potential dangers to the health of the operators and the safety and environmental protection of laboratory. Therefore, there is an urgent need to develop an separation apparatus for the four fractions which has easy steps, high degree of automation, good separation effects, and low solvent consumption, so as to lay a foundation for the development of a method for measuring four fractions which has a better precision, less labor and time, and safety and environmental protection.

The American Society for Testing and Materials also has a similar method standard ASTM D-4124. Compared with the separation apparatus proposed in NB/SH/T 0509, the main improvement in ASTM D-4124 is a plunger pump which is adopted for controlling the flow rate of the elution solvent in step (4), so as to improve the speed and repeatability of separation. A peristaltic pump is used in Chinese utility model patent CN207366580U for controlling the flow rate of elution solvent, an angle splitter is further used for realizing the automatic switching of the elution solvent and the automatic receiving of the eluted fractions, and a solvent condensation recovery apparatus is further added therein. On the basis of realizing the control of flow rate with pump, automatic switching of solvents, collection of eluted fractions, and recovery of solvents, an automatic analyzer for four fractions of heavy oil (model BN-118) produced by Dalian Bangneng Petroleum Instrument Co., Ltd has further added an automatic column packing apparatus which uses mechanical vibrations to replace the manual tap in step (3). However, when the above devices are used to separate four fractions, the following problems still exist: (1) it is still necessary to separate the asphaltenes according to step (2), and this cumbersome step cannot be omitted; (3) the glass conical flask of 150 mL-250 mL are still used as receiving containers, so that the weighing error caused by the excessive mass of the container is still unavoidable; and (4) a chromatographic column packed in a glass tube is still used for separation, which requires a long separation time and a large amount of solvent. Therefore, the separation of four fractions using the improved apparatus described above is still a time-consuming and manual process, which affects the simplicity and accuracy of the four fractions measurement.

Medium pressure liquid chromatography refers to preparative liquid chromatography that is operated at 5 bar-20 bar. Generally, this pressure is provided by a pump. Compared with a normal pressure or low pressure chromatography column, a medium pressure chromatography column uses finer packing materials, which can be packed more tightly, and correspondingly, the column efficiency will be higher; since the solvent flows under the pressure, the back pressure of the chromatography column can be higher, so the column efficiency can be improved by increasing the length of the column; flow rate of solvent of the medium pressure liquid chromatography is controllable and gradient elution can be achieved, which has the advantages of good repeatability of separation, short separation time, and less solvent consumption. In addition, compared with the high pressure liquid preparative chromatography, the medium pressure chromatography instruments and chromatographic columns are cheaper, and chromatographic columns can even be made into disposable consumables. Therefore, medium pressure liquid chromatography has a wide range of applications in the food, pharmaceutical and other industries, and it is an efficient, economical and precise means of chromatographic separation.

However, the medium pressure liquid chromatography has not yet achieved successful application in the separation of four fractions of heavy oil. The difficulties in achieving a fast, accurate, highly automated, and low solvent consumed separation of four fractions of heavy oil by using medium pressure liquid chromatography are: (1) changing the asphaltenes separation step to a method that can be carried out online and automatically; (2) using a medium pressure chromatography column with a smaller volume to achieve four fractions separation effects equivalent to or better than the chromatography column with a larger volume in original standard; (3) achieving online collection of four fractions eluents and simultaneous solvent removal and reach constant weight, and reducing weighing errors; and (4) setting the splitting and solvent preheating apparatus on the basis of (1) to (3) to achieve simultaneous separation by using multiple paths and meet the needs of several samples and parallel experiments. Currently, there is no apparatus that can overcome any of the above-mentioned difficulties.

SUMMARY

An object of the present disclosure is to provide an automatic separation apparatus for four fractions of heavy oil capable of realizing the automatic and rapid separation of four fractions of heavy oil, thereby saving time, reducing manual-induced operating errors, and improving the precision of separation and measurement.

Another object of the present disclosure is to provide an automatic separation method for four fractions of heavy oil capable of realizing the automatic and rapid separation of the four fractions of heavy oil, thereby saving time, reducing manual-induced operating errors, and improving the precision of separation and measurement.

To achieve the above objects, the present disclosure provides an automatic separation apparatus for four fractions of heavy oil comprising:
 a solvent reservoir tank;
 a separation unit for four fractions of heavy oil, comprising:
  a filter disc having one end in communication with the solvent reservoir tank, and the other end in communication with a first inlet of a pre-column flow path switching valve;
  a chromatographic column having an inlet in communication with the first outlet of the pre-column flow path switching valve, and an outlet in communication with a first inlet of a post-column flow path switching valve; and
  a bypass pipeline having one end in communication with a second outlet of the pre-column flow path switching valve, and the other end in communication with a second inlet of the post-column flow path switching valve; and
 a receiving apparatus in communication with an outlet of the post-column flow path switching valve.

The present disclosure further provides a separation method for four fractions of heavy oil comprising the following steps of:
 S1: adding the heavy oil dispersed with a first solvent into a separation unit for four fractions of heavy oil, the heavy oil flowing through a filter disc and a chromatographic column sequentially, and using the first solvent to flush the separation unit for four fractions of heavy oil, to obtain a saturates eluent;
 S2: switching a pre-column flow path switching valve and a post-column flow path switching valve, adding a second solvent into the separation unit for four fractions of heavy oil for flushing, and the second solvent flowing through the filter disc and a bypass pipeline sequentially, to obtain an asphaltenes eluent;
 S3: switching the pre-column flow path switching valve and the post-column flow path switching valve, adding the second solvent into the separation unit for four fractions of heavy oil for flushing, and the second solvent flowing through the filter disc and the chromatographic column sequentially, to obtain an aromatics eluent;
 S4: adding a third solvent, a second solvent, and a fourth solvent sequentially into the separation unit for four fractions of heavy oil for flushing, to obtain a resins eluent, and using a receiving apparatus to collect eluents respectively obtained in S1-S4.

Compared with the prior arts, the present disclosure has the following advantages:
 the automatic separation apparatus for four fractions of heavy oil and separation method thereof in the present disclosure can realize the online automatic separation and receiving of asphaltenes, saturates, aromatics and resins, and can remove solvents therefrom. In the separation process of four fractions, the asphaltenes can be automatically separated online by providing a filter disc and flow path switching valves, thereby eliminating tedious separation steps, reducing the manual steps, greatly saving time and solvent consumption, further reducing manual-induced operating errors, reducing deviations, and improving the precision of separation and measurement.

BRIEF DESCRIPTION OF DRAWINGS

Embodiments of the present disclosure will be described in further detail below with reference to the accompanying drawings.

DESCRIPTION OF REFERENCE NUMBER

1. Solvent reservoir tank;
100. Separation unit for four fractions of heavy oil;
2. Pump;
3. Sample loading apparatus;
4. Filter disc;
5. pre-column flow path switching valve;
6. Chromatographic column;
7. Bypass pipeline;
8. Post-column flow path switching valve;
9. Receiving apparatus;
10. Column oven;
11. Heating element;
12. Metal pipe;
13. Fixing element;
14. Top cover of heat exchange box;
15. Box;
16. Receiving container;
17. Transmission apparatus;
18. Heating component;
19. Vent hole;
20. Liquid channel.

DESCRIPTION OF EMBODIMENTS

Figure 6:
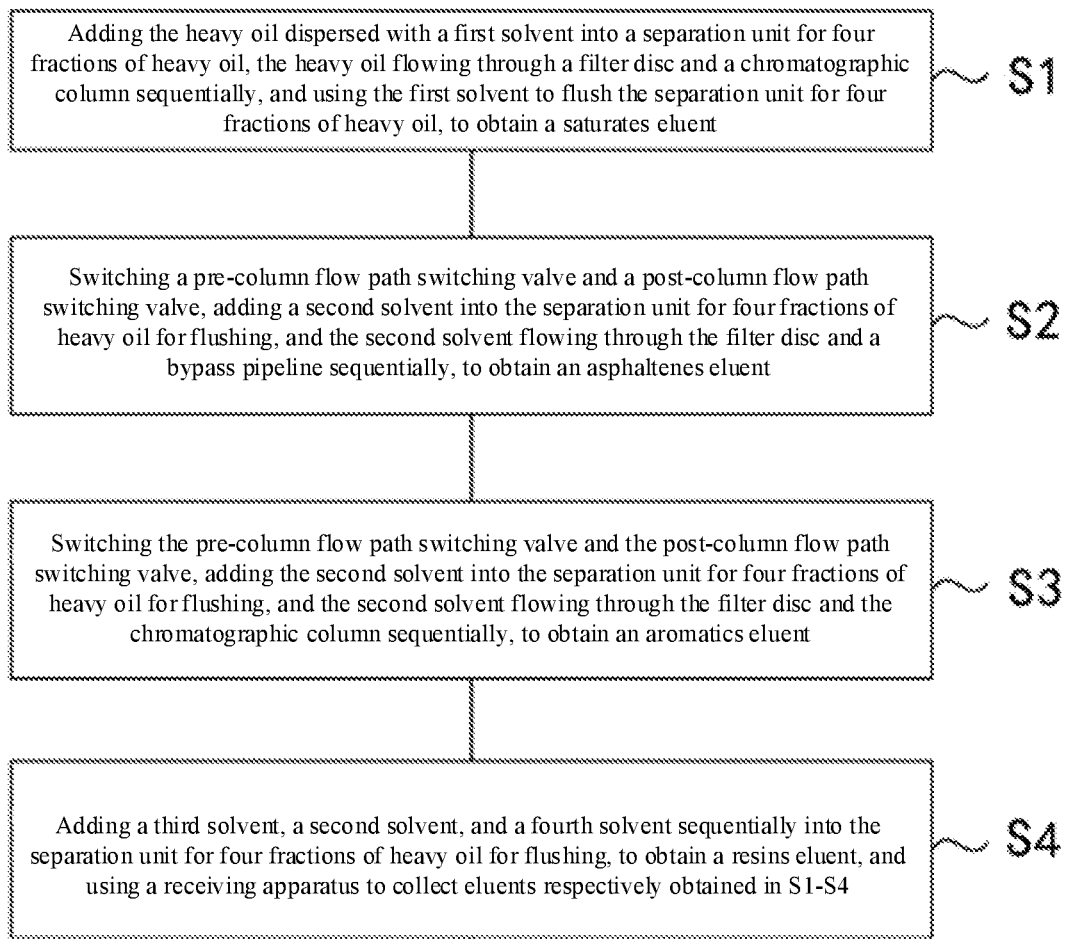
FIG. 6 is a flowchart of steps of a separation method for four fractions of heavy oil according to the present disclosure.
Figure 7:
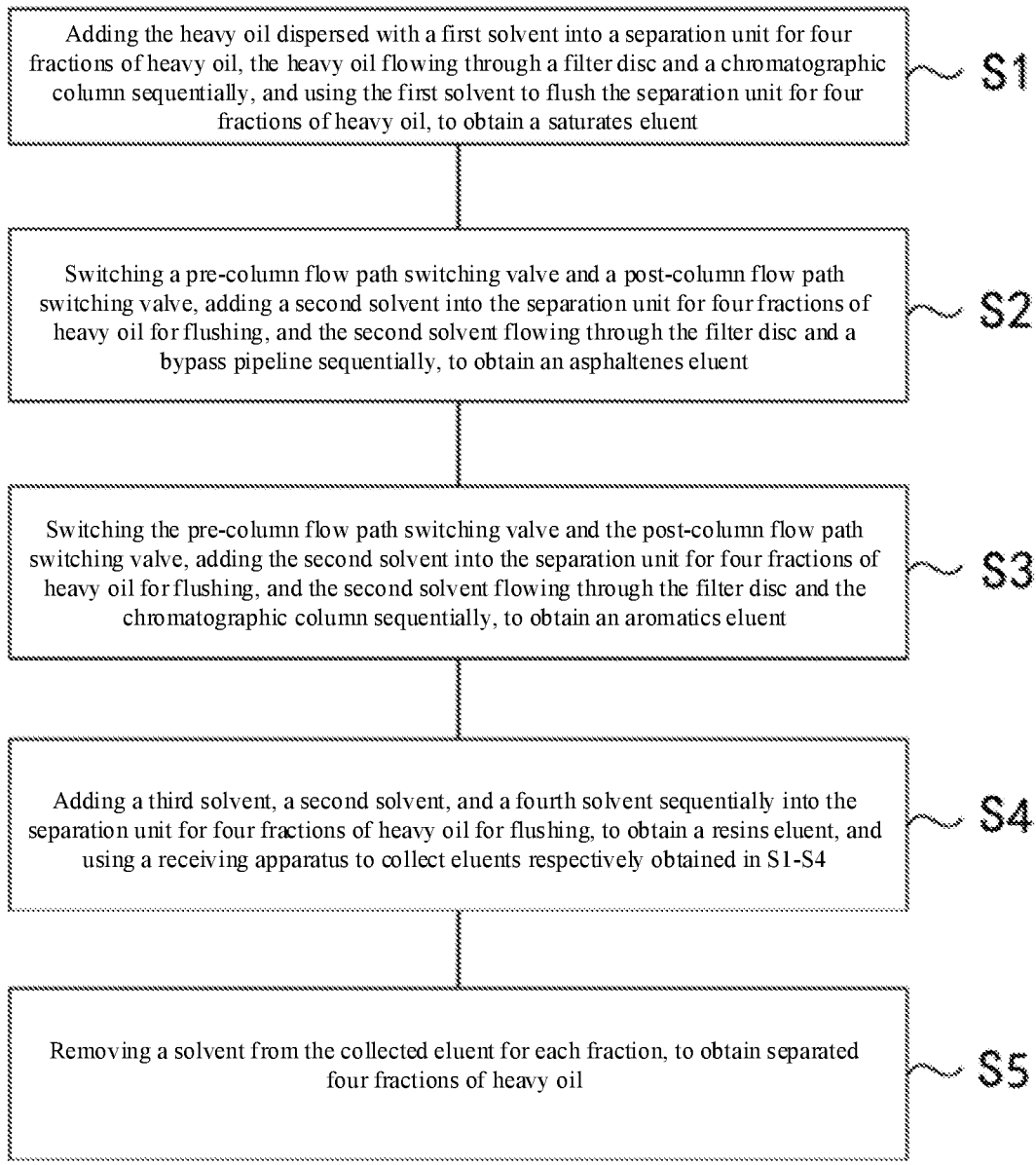
FIG. 7 is another flowchart of steps of the separation method for four fractions of heavy oil according to the present disclosure.

Referring to FIG. 6 and FIG. 7, which are flowcharts of steps of the separation method for four fractions of heavy oil according to the present disclosure. The separation method for four fractions of heavy oil according to the present disclosure includes the following steps of:

S1: adding the heavy oil dispersed with a first solvent into a separation unit for four fractions of heavy oil 100, the heavy oil flowing through a filter disc 4 and a chromatographic column 6 sequentially, and flushing the separation unit for four fractions of heavy oil 100 with the first solvent, to obtain a saturates eluent;

S2: switching a pre-column flow path switching valve 5 and a post-column flow path switching valve 8, adding a second solvent into the separation unit for four fractions of heavy oil 100 for flushing, and the second solvent flowing through the filter disc 4 and a bypass pipeline 7 sequentially, to obtain an asphaltenes eluent;

S3: switching the pre-column flow path switching valve 5 and the post-column flow path switching valve 8, adding the second solvent into the separation unit for four fractions of heavy oil 100 for flushing, and the second solvent flowing through the filter disc 4 and the chromatographic column 6 sequentially, to obtain an aromatics eluent;

S4: adding a third solvent, a second solvent, and a fourth solvent sequentially into the separation unit for four fractions of heavy oil 100 for flushing, to obtain a resins eluent, and using a receiving apparatus 9 to collect eluents obtained in S1-S4, respectively.

In addition, it further includes step S5: removing a solvent from the collected eluent for each fraction, to obtain separated four fractions of heavy oil.

In the separation method for four fractions of heavy oil in the present disclosure, the first solvent is an organic solvent that can dissolve saturates, aromatics and resins, but cannot dissolve asphaltenes; and is preferably C7-C8 alkanes. The second solvent is an organic solvent that can dissolve the asphaltenes and the aromatics, and is preferably aromatics hydrocarbons, such as toluene or benzene. The third solvent is a mixed solvent composed of the second solvent and monohydric alcohol in a volume ratio of 0.5-2. The fourth solvent is a monohydric alcohol; preferably methanol or ethanol. Among these, the boiling points of the first solvent, the second solvent, the third solvent and the fourth solvent may not exceed 150° C.

The amount of heavy oil used in step S1 is not more than 0.05 g per gram of the packing materials of chromatographic column. The volume of the first solvent for dispersing the heavy oil in step S1 is 1-10 times the volume of the heavy oil; and the volume of the first solvent for flushing the separation unit for four fractions of heavy oil 100 is not less than 100 times the volume of the heavy oil. The volume of the second solvent for flushing the separation unit for four fractions of heavy oil 100 in step S2 is not less than 100 times the volume of the heavy oil. The volume of the second solvent for flushing the separation unit for four fractions of heavy oil 100 in step S3 is 1-10 times, preferably 2-6 times the dead volume of the chromatography column 6. In step S4, the volume of the third solvent for flushing the separation unit for four fractions of heavy oil 100 is 1-5 times the dead volume of the chromatography column 6, the volume of the second solvent for flushing the separation unit for four fractions of heavy oil 100 is 1-5 times the dead volume of the chromatography column 6, and the volume of the fourth solvent for flushing the separation unit for four fractions of heavy oil 100 is 1-5 times the dead volume of the chromatography column 6.

Figure 1:
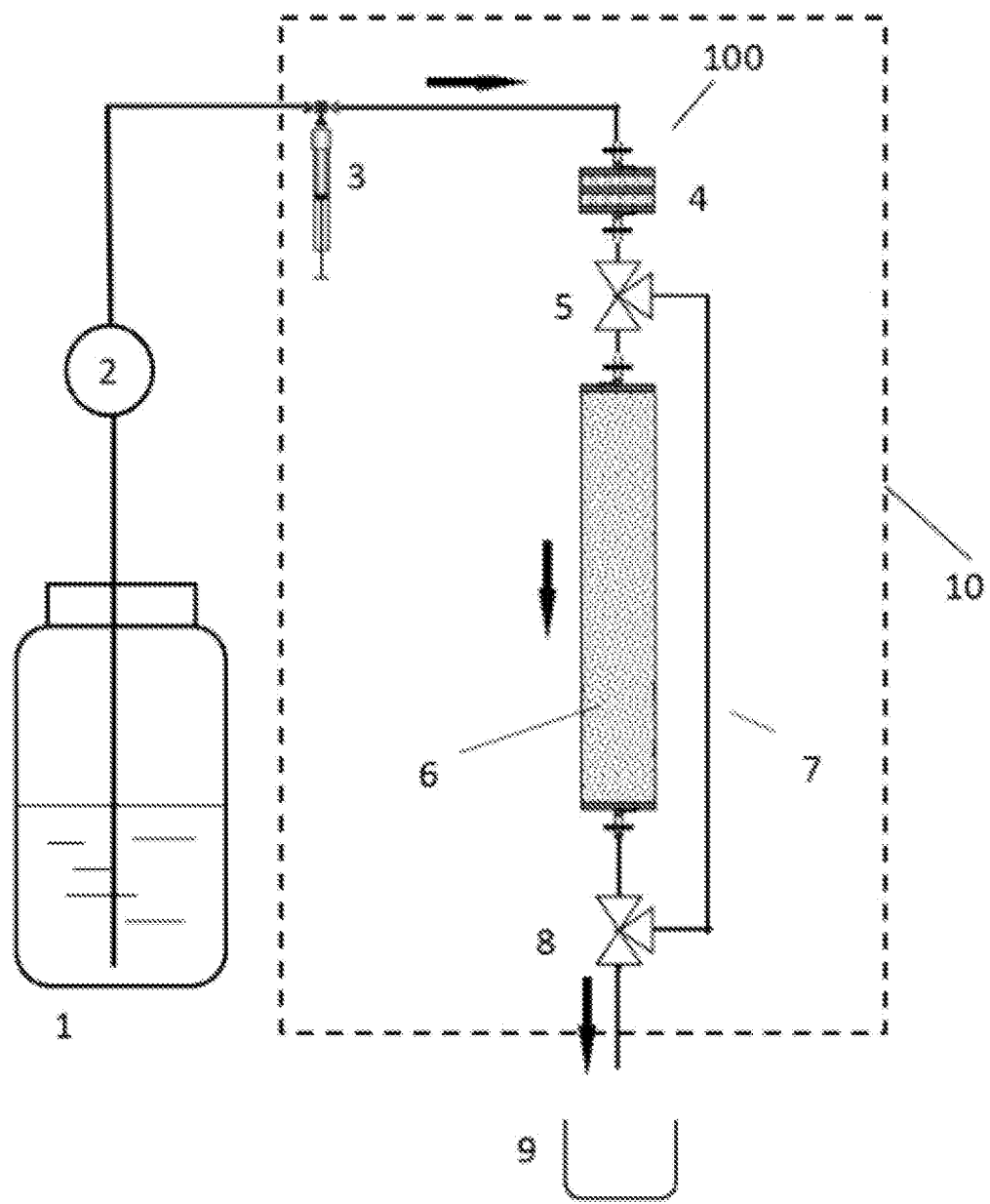
FIG. 1 is a schematic diagram of a structure and solvent flow path for applying an automatic separation apparatus for four fractions of heavy oil of the present disclosure.

Referring to FIG. 1, which is a schematic view of a structure and a solvent flow path of an automatic separation apparatus for four fractions of heavy oil for applying the separation method according to the present disclosure. Heavy oil refers to a mixture of one or more of asphalt, vacuum residue, and catalytic slurry, and the four fractions refers to asphaltenes, resins, saturates, and aromatics. In this embodiment, the automatic separation apparatus for four fractions of heavy oil includes a solvent reservoir tank 1, a separation unit for four fractions of heavy oil 100, and a receiving apparatus 9. The solvent reservoir tank 1 stores the solvent required for the separation process, and the direction indicated by the arrow in FIG. 1 is a flowing direction of the solvent in the apparatus. The pump 2 is arranged between the solvent reservoir tank 1 and the separation unit for four fractions of heavy oil 100, and the solvent in the solvent reservoir tank 1 is pumped into the separation unit for four fractions of heavy oil 100 through the pump 2. In addition, optionally, a sample loading apparatus 3 is arranged between the pump 2 and the four fractions separation for unit heavy oil 100. The sample loading apparatus 3 can be an injector, or other sample loading apparatus in other embodiments, which is not limited in the present disclosure. The heavy oil is added through the sample loading apparatus 3, and after being mixed with the solvent in the pipeline, the heavy oil flows into the separation unit for four fractions of heavy oil 100. The flow rate of pump 2 is 0.5 mL/min-1.5 mL/min.

Herein, the solvent reservoir tank 1 is used to contain the solvent used for separation. The pump 2 is used to extract the solvent from the solvent reservoir tank 1 and provide a pressure at the outlet end of the pump 2 to allow the solvent to flow through the separation unit for four fractions of heavy oil 100. A heavy oil sample can be added into the separation unit for four fractions of heavy oil 100 by using the sample loading apparatus 3, wherein the heavy oil sample can be pushed to the separation unit for four fractions of heavy oil 100 by using an injector or by online sampling and so on. This disclosure does not limit the path or form of adding the heavy oil sample into the separation unit for four fractions of heavy oil 100.

With continued reference to FIG. 1, the separation unit for four fractions of heavy oil 100 includes a filter disc 4, a pre-column flow path switching valve 5, a chromatographic column 6, a bypass pipeline 7 and a post-column flow path switching valve 8. One end of the filter disc 4 is connected to the pump 2. The other end of the filter disc 4 is in communication with the inlet of the pre-column flow path switching valve 5. In this embodiment, the pre-column flow path switching valve 5 is an one inlet to two outlets switching valve. One outlet of the pre-column flow path switching valve 5 is in communication with the inlet of the chromatographic column 6, and the other outlet of the pre-column flow path switching valve 5 is in communication with one end of the bypass pipeline 7. The post-column flow path switching valve 8 is a two inlets to one outlet switching valve. One inlet of the post-column flow path switching valve 8 is in communication with the outlet of the chromatographic column 6, and the other inlet of the post-column flow path switching valve 8 is in communication with the other end of the bypass pipeline 7. In addition, the outlet of the post-column flow path switching valve 8 is in communication with the receiving apparatus 9, and the filter disc 4 is arranged in front of the chromatographic column 6, allowing the present disclosure to adopt online filtering to separate asphaltenes, and avoiding cumbersome steps for separation of asphaltenes.

The solvent and heavy oil pumped into the separation unit for four fractions of heavy oil 100 are filtered through the filter disc 4 to separate asphaltenes from the heavy oil, thereby avoiding the cumbersome steps for separation of asphaltenes. In this embodiment, the filter disc 4 is provided with two layers of filter membranes. Of course, in other embodiments, the filter disc 4 can be provided with one or more layers of filter membranes, and the pore size of filter membranes can be set in a range between 0.1 μm and 100 μm. The filter disc 4 should be made of materials that are not swelled or dissolved by toluene, n-heptane, or ethanol. The filtered solvent enters the chromatographic column 6 or the bypass pipeline 7 through a pre-column flow path switching valve 5 which has one inlet and two outlets.

In this embodiment, the packing of the chromatographic column 6 is preferably alumina, which has a specific surface area of 150 $m^2/g$-200 $m^2/g$, a pore volume of 0.25 mL/g-0.35 mL/g, and a water content of 0.5%4% (mass fraction), where a mass of alumina having a particle size of 60 microns-200 microns accounts for 60%-80% of a total mass of the packing materials, and the amount of alumina is not less than 20 g per gram of the heavy oil samples. The column layer after the packing of alumina has a height-to-diameter ratio of not less than 5:1, and a density of not less than 0.8 $g/m^3$. The heavy oil enters the chromatographic column 6 to separate the aromatics and resins. The design of the pre-column flow path switching valve 5, the bypass pipeline 7 and the post-column flow path switching valve 8 allows the chromatographic column to stay in and switch out of the eluent path according to the elution progress. It is then discharged from the outlet of the post-column flow path switching valve 8 into the receiving apparatus 9.

Figure 5:
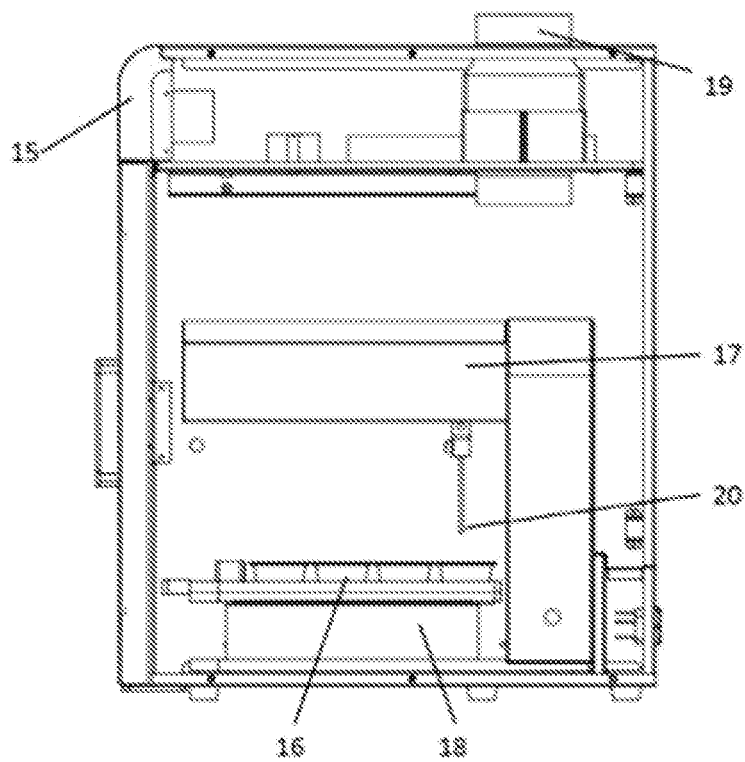
FIG. 5 is a schematic diagram of a structure of a receiving apparatus for applying an embodiment of the present disclosure.

Referring to FIG. 1 and FIG. 5 simultaneously. FIG. 5 is a schematic structural diagram of a receiving apparatus in an embodiment for applying the separation method according to the present disclosure. In order to realize the automatic online receiving and removal of the solvents from the four fractions eluents after separation by the chromatographic column 6, and to solve the influence of the excessive mass of the container on the accuracy of weighing, the preferred receiving apparatus 9 of the present disclosure is an automatic receiving apparatus for eluent. The automatic receiving apparatus for eluent includes a box 15, several receiving containers 16 arranged within the box 15, a transmission apparatus 17 and a liquid channel 20. The receiving container 16 is provided at the bottom of the box 15. The transmission apparatus 17 is arranged above the receiving container 16, the liquid channel 20 is arranged on the transmission apparatus 17, and the outlet of the liquid channel 20 faces the receiving container 16. In addition, the outer surface of the receiving container 16 is also provided with a heating component 18, and the top of the box 15 is provided with a vent hole 19. The receiving container 16 is made of lightweight materials, preferably aluminum-plastic materials, which has a thickness of 0.1 mm-1 mm and a capacity of 10 mL-50 mL.

The transmission apparatus 17 can distribute the different eluents discharged from the post-column flow path switching valve 8 to the corresponding receiving container 16 through control instructions of a computer. The transmission apparatus 17 can also adopt other modes through control instructions of the computer. For example, different eluents discharged from the post-column flow path switching valve 8 are respectively passed through different liquid channels, and the receiving container is moved such that the eluents can be added to the receiving container 16 at a corresponding location. A linear moving mechanical arm or a rotating mechanical arm can be used on the transmission apparatus 17.

The automatic receiving apparatus for eluent has a heating component 18 that heats the receiving container. The heating component 18 can heat the receiving container 16 to 40° C.-100° C. to volatilize the solvent, thereby obtaining the separated four fractions of heavy oil. The vent hole 19 is connected with a vent hood or a solvent recovery processing apparatus of the laboratory to process or recover the evaporated solvent.

Referring to FIG. 1 again, in this embodiment, the automatic separation apparatus for four fractions of heavy oil further includes a column oven 10. The separation unit for four fractions of heavy oil 100 is provided within the column oven 10. The column oven 10 is also provided with a heater and a fan (not shown in the figure), and the fan is placed behind the heater. The fan disperses the heat generated by the heater into the column oven 10 so that the temperature in the column oven 10 is maintained within the range required for the separation process, which prevents part of the fractions in the heavy oil from separating out from the solvent and affects the separation effect. The heater and fan can be provided with an isolation hood to prevent the operator from accidentally touching the surface of the heater and causing burns.

Among them, the specific structures and installation methods of the heater, the fan, and the isolation hood are all the prior art, and will not be repeated here.

Figure 2:
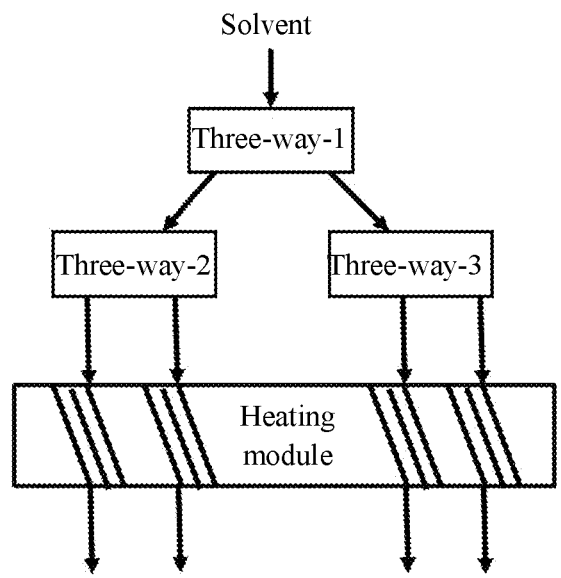
FIG. 2 is a schematic diagram of a liquid splitting apparatus for applying an embodiment of the present disclosure.
Figure 3:
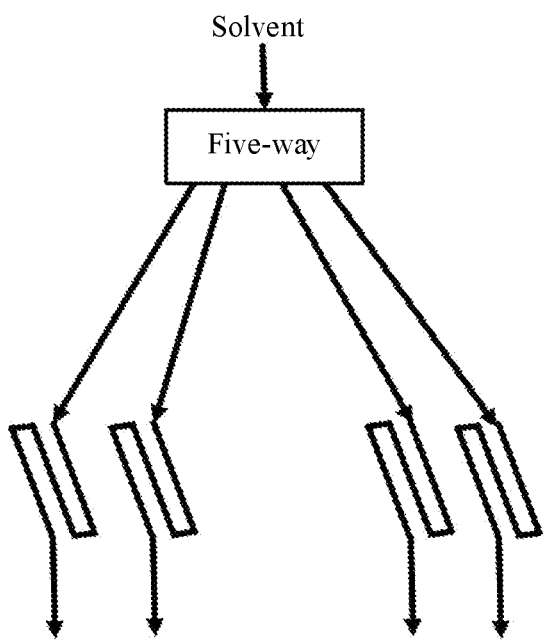
FIG. 3 is a schematic diagram of a liquid splitting apparatus for applying an embodiment of the present disclosure.
Figure 4:
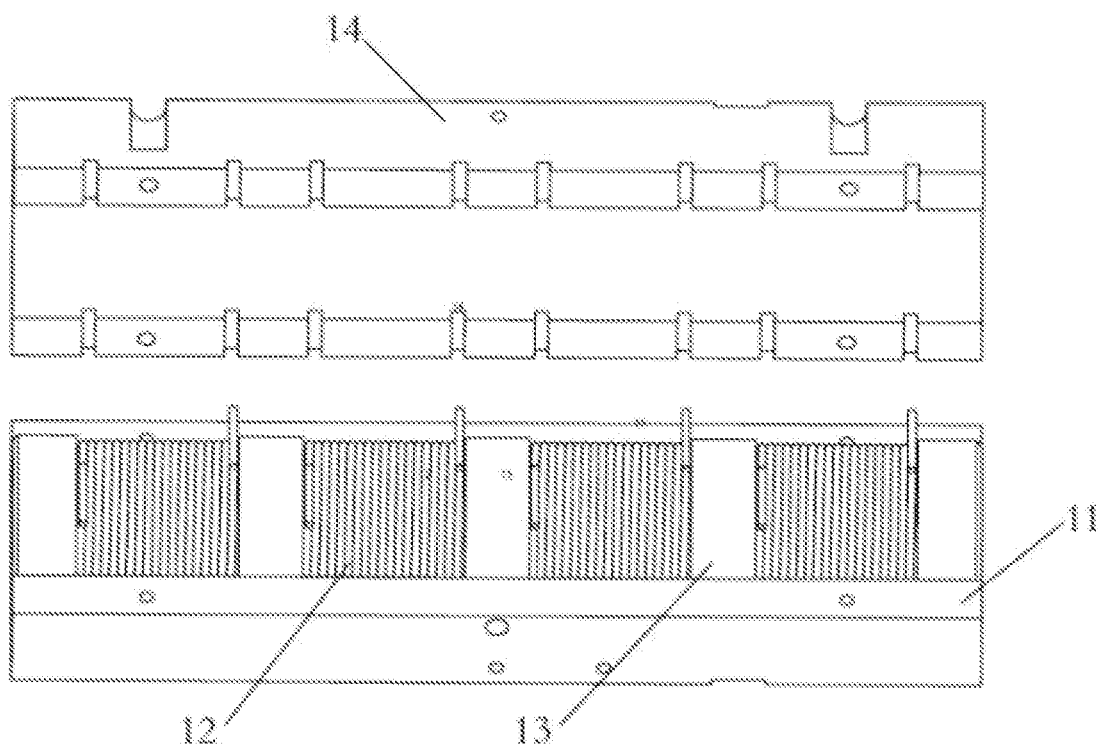
FIG. 4 is a schematic diagram of a metal tube wound on a heating element in sections for applying the present disclosure.

Referring to FIG. 2, FIG. 3 and FIG. 4, FIG. 2 is a schematic diagram of a liquid splitting apparatus in an embodiment for applying the separation method according to the present disclosure; FIG. 3 is a schematic diagram of a liquid splitting apparatus in another embodiment for applying the separation method of the present disclosure; FIG. 4 is a schematic diagram of the metal tube wound on a heating element in sections for applying the separation method of the present disclosure. In order to ensure the accuracy of the measurement results, it is usually necessary to perform at least two parallel experiments, and take the average of the experimental results as the final measurement result. In the present disclosure, two or more separation units for four fractions of heavy oil 100 are preferably arranged in parallel. The automatic separation processes of four fractions of heavy oil are carried out simultaneously in parallel, so that the samples can be processed in multiple parallel experiments at the same time, thereby saving experimental time. For this purpose, a liquid splitting apparatus which has three multi-way joint with equal-divided paths (as shown in FIG. 2) or one multi-way joint with four paths (as shown in FIG. 3) for splitting liquid is provided between the sample loading apparatus 3 and the separation unit for four fractions of heavy oil 100. As shown, the liquid splitting apparatus includes a splitter and four paths of metal pipes with equal back pressure. The splitter includes an inlet and three three-way pipes, namely three-way-1, three-way-2, and three-way-3. The branch pipes of three-way pipes have equal inner diameters and equal total lengths. The four paths of metal pipes 12 with equal back pressures have inner diameters of 0.05 mm-0.5 mm, and length-to-diameter ratios of 5000:1-50,000:1. In addition, a heating element 11 may also be provided, and the heating element 11 here is a metal heating element 11. The heating element 11 is also provided with a fixing element 13. As shown in FIG. 4, the fixing element 13 is a metal sheet with grooves. Four paths of metal pipes 12 with equal back pressures are wound on the fixing element 13, and a top cover 14 of the external heat exchange box is covered on the heating element 11. The outlet ends of the four paths of metal pipes 12 with equal back pressures are connected to the inlet end of the separation unit for four fractions of heavy oil 100. After being split by the liquid splitting apparatus, the solvent is injected into four separation units for four fractions of heavy oils 100 so that multiple groups of automatic separation processes for four fractions of heavy oil can be performed in parallel at the same time, thereby multiple groups of parallel experiments can be performed at the same time. The fixing element 13 can fix the metal pipe 12 so as to prevent the metal pipe 12 from sliding off the heating element 11 and failing to be heated. The top cover of the heat exchange box 14 can have a heat preservation effect on the heating element 11 and the metal pipe 12 to ensure that the temperature is controlled within the required range, preferably the temperature is 40° C.-60° C.

It should be noted that the solvent in the solvent reservoir tank 1 is preferably passed through the heating element 11 before being injected into the filter disc 4 by the pump 2, and the heated solvent is split through parallel lines, delivered to each group separately, and enters the filter disc 4 separately. The present disclosure does not particularly limit how to split the solvent and set up the parallel lines, and also does not particularly limit whether to heat the solvent and how to heat it.

When using the separation method for four fractions of heavy oil in the present disclosure, the heavy oil is firstly dispersed using a first solvent such as n-heptane, and then the dispersed heavy oil is added to the filter disc 4, which is eluted with n-heptane. At this time, a flow direction of n-heptane and heavy oil is liquid inlet—filter disc 4—chromatographic column 6—liquid outlet. At this time, when n-heptane is loaded and eluted, n-heptane can dissolve saturates, aromatics and resins, but cannot dissolve asphaltenes, so that asphaltenes are trapped on the filter disc 4. The saturates, aromatics and resins that can be dissolved in n-heptane enter chromatographic column 6. Among them, the saturates are weak in polarity and cannot be retained by chromatographic column 6. Therefore, it is first eluted from chromatographic column 6, and saturates eluent is obtained. The aromatics and resins which are strong in polarity remain on the chromatographic column 6 for further elution. The asphalt is trapped on the filter disc 4 since it cannot be dissolved in the first solvent.

Then, the pre-column flow path switching valve 5 is rotated to cut out the chromatographic column 6. At this time, a flow direction of the liquid is liquid inlet—filter disc 4—bypass pipeline 7—liquid outlet. The asphaltenes on the filter disc 4 is eluted with a second solvent such as toluene, and the asphaltenes dissolved in toluene does not flow through the chromatographic column 6 but directly leads to subsequent detection or receiving apparatus 9. At the same time, as there is no chromatographic solvent flows through the chromatographic column 6 which is outside the flow direction, the aromatics and resins temporarily retained on the chromatographic column 6 are not affected. After the asphaltenes on the filter disc 4 is completely dissolved by toluene and eluted to the subsequent detection or receiving apparatus 9, the next step is performed.

The pre-column flow path switching valve 5 is rotated again to cut into the chromatographic column 6. At this time, a flow direction of the liquid returns to the sequence of liquid inlet—filter disc 4—chromatographic column 6—liquid outlet. Firstly, it is eluted with a second solvent such as toluene to obtain the aromatics eluent, and the subsequent detection or receiving apparatus 9 is used for online analysis or collection. Then, maintaining the flow direction, the third solvent, the second solvent and the fourth solvent are used for elution in sequence, so as to obtain the resins eluent, and the subsequent detection or receiving apparatus 9 is used for online analysis or collection.

In order to prevent the asphaltenes flowing out of the bypass pipeline 7 from flowing back into the chromatographic column 6, the post-column flow path switching valve 8 and the pre-column flow path switching valve 5 need to be in the same phase to play a protective role.

When filtering the asphaltenes, the temperature of the solvent has a great influence on the dissolution of non-asphaltenes. Generally, the preferred temperature is 40° C.-60° C. If the solvent is not heated when separating the fractions, some fractions, such as long-chain saturated hydrocarbon, may precipitate out of the solvent. In order to allow the solvent to be fully preheated before reaching the filter disc 4, a heating element 11 is added to the liquid splitting apparatus in the present disclosure. The heating element 11 can use a metal or a heat exchange liquid such as an oil bath, etc. to heat the solvent in the metal pipe 12 to a temperature required by the actual analytical method In addition, the heating element 11 can also compensate for the errors of the split. The principle is as follows: if there are uneven split pressures for parallel channels in multiple paths, the actual flow rate will be low for the channel with relatively high back pressure, the solvent therein will stay for a long time, the heat exchange is sufficient, and the temperature is high, thus the viscosity decreases and the pressure decreases, which can partially compensate for the error of split caused by the parallelism of pipeline processing, and further ensure the consistency of the flow in each channel.

Of course, in other embodiments, the separation unit for four fractions of heavy oil 100 can also be designed in other numbers, and the present disclosure is not limited thereto. The number of the separation units for four fractions of heavy oil 100 can be expressed as n, where n is an integer greater than or equal to 1, and the liquid outlet ends of the n paths of metal pipes with equal back pressures are in communication with the liquid inlet ends of the separation units for four fractions of heavy oil 100, and the number of the liquid outlet ends is equal to the number of the liquid inlet ends. The splitter can be designed as a multi-way pipe with three or more ways, and the number of the splitters can also be one or more. When the number of splitters is more than one, total lengths of respective branches should be ensured to be equal. When there are n channels, each channel is split passively, and back pressures of respective channels are expressed as P1, P2, P3 . . . Pn. When the infusion flow rate of the pump is V, infusion flow rates of respective channels are correspondingly expressed as V1, V2, V3 . . . Vn. The total back pressure P of the split channels can be calculated by the following equation:

$$P=1/(1/P1+1/P2+1/P3+\ldots+1/Pn);$$

The infusion flow rate Vn for each channel can be calculated by the following equation 1:

$$Vn=V*P/Pn. \quad \text{equation 1:}$$

In particular, in the case that the split pipelines are equal in length with respect to each other, the equation can be converted using the length of pipeline of each channel, as the total back pressure is directly proportional to the length of the pipeline.

$$L=1/(1/L1+1/L2+1/L3+\ldots+1/Ln);$$

Then, $Vn=V*L/Ln$;
L1, L2, L3 . . . Ln represent lengths of pipelines in each channel.

Corresponding to a special case of multiple-channels and parallel split fluids in which equal-length pipelines are used, equation 2 can be: $Vn=V/n$.

However, due to the processing problems including but not limited to the effects of pipeline interception length, pipeline end state, inner diameter uniformity, inner wall finish, etc., it is split passively in parallel and multiple channels, the accuracy of split is affected by parallelism of pipeline pressure. According to equation 1, a channel with a lower actual pressure $\Delta Pn$ approximately has a higher flow rate $\Delta Vn=V/n*\Delta Pn/\overline{P}$. A channel with a higher actual pressure $\Delta Pn$ approximately has a lower flow rate $\Delta Vn=V/n*\Delta Pn/\overline{P}$. When the pressure deviation $\Delta Pn$ for a certain channel is much less than an average operating pressure $\overline{P}$ for respective channels, $\Delta Pn/\overline{P}$ is close to 0, and the flow deviation can be ignored, that is, splitting in parallel is realized. FIG. 2 and FIG. 3 show the case where the number of split channels is 4.

The present disclosure adopts multiple equal-length metal pipes with an inner diameter of 0.05 mm-0.5 mm and a length-to-diameter ratio of 5000:1-50000:1 as the multiple liquid channels. When the input fluid flows through these metal pipes, as the pressure generated by damping in each channel is much greater than a pressure difference among different channels, equal flow distribution can be achieved in each metal pipe, and at the same time, lower cost can be achieved compared to the apparatus that uses a rotary valve or a solenoid valve etc. to actively split according to a start time. It is also possible to divide the metal pipe of each channel into multiple sections and connect them with joints.

Embodiment 1

A structure of the separation apparatus for four fractions of heavy oil as shown in FIG. 1 is used.

In this embodiment, two three-way solenoid valves are adopted as a pre-column flow path switching valve 5 and a post-column flow path switching valve 8, and software is used to control the pre-column flow path switching valve 5 and the post-column flow path switching valve 8 to lead the chromatographic solvent output from the filter disc 4 into the chromatographic column 6 or the bypass pipeline 7 through switching. In order to prevent the asphaltenes flowing out of the bypass pipeline 7 from flowing back into the alumina chromatographic column 6, the pre-column flow path switching valve 5 and the post-column flow path switching valve 8 are set to the same phase to play a protective role.

In this embodiment, a glass fiber filter disc with a filter membrane having a pore size of 100 μm, and an alumina chromatographic column with a capacity of 12 g, a column tube inner diameter of 13 mm and a column length of 110 mm are used. A mass of alumina particles having a particle size of 60 microns-200 microns accounts for 68% of the total mass, the specific surface area is 175 $m^2/g$, and the pore volume is 0.33 mL/g in the alumina.

The liquid splitting apparatus in this embodiment uses a five-way pipe with one inlet and four outlets as the splitter. As shown in FIG. 3, the mobile phase can be split into four paths, and the heating element 11 adopted is a metal heater that conducts heat in direct contact with the metal to preheat the solvent to 50° C. The material of the metal pipe is 316 stainless steel, and the metal pipe is a pipeline with an inner diameter of 0.1 mm and a length-to-diameter ratio of 15000. As shown in FIG. 4, the metal pipe 12 is wound on the fixing element 13 on the surface of the heating element 11. The groove design on the fixing element 13 can separate the four pipelines. There is a top cover of the heat exchange box 14 above the heating element 11, and the top cover is made of stainless steel. For the sake of clarity, FIG. 4 shows a case in which the top cover of the heat exchange box 14 is removed.

The design of the receiving apparatus 9 in this embodiment is shown in FIG. 5, and the receiving apparatus 9 shown in FIG. 5 is an automatic receiving apparatus for eluent: the liquid flowing out behind the post-column flow path switching valve 8 flows into the box 15 of the receiving apparatus 9 through the pipeline. The transmission apparatus 17 is composed of a guide rail that can move back and forth under the control of a motor and an outlet for the elution solvent. The position of the liquid channel 20 can be controlled by a computer so that it can be aligned with a receiving container 16 for receiving the saturates, asphaltenes, aromatics, and resins as needed during the experiment. A heating component 18 is provided below the receiving container. During the elution process, the heating component 18 and the receiving container 16 do not move. Similarly, an apparatus that has a degree of freedom in the θ-axis direction and rotates with the flow of the fractions can also be used to achieve this function. In this embodiment, a sample cup made of aluminum-plastic material with a thickness of 0.5 mm and a capacity of 25 mL is used as the receiving container 16. The sample cup is placed on the heating component 18 and heated according to application requirements while receiving for online evaporation of the solvent. The receiving apparatus 9 including the heating component 18 is enclosed in a closed box 15, and the box 15 is matingly fitted with an active fan to discharge the vaporized solvent vapor into the vent hole 19. Under the operating conditions in this embodiment, the elution and the solvent evaporation can be performed simultaneously, that is, the solvent is substantially evaporated to dryness when the elution is completed.

When the automatic separation apparatus for four fractions of heavy oil in this embodiment is used for the separation of four fractions, the sample loading, separation, and eluent receiving of each path are operated as follows. Four paths of parallel experiments can be performed at the same time. Only one path is described here, and the others are the same. The results of their respective parallel experiments are obtained.

The pipelines between the sample loading apparatus 3 and the pre-column flow path switching valve 5 in FIG. 1 are directly connected without attaching the filter disc 4 therein. The chromatographic column 6 is fitted and fixed in a vertical position. The column oven 10 of the instrument is heated to 50° C., and the temperature of heating component 18 of the sample receiving apparatus 9 increases to 70° C. The chromatographic column 6 is wetted with n-heptane and the flushing is stopped until the effluent from the outlet of the liquid channel 20 of the receiving apparatus 9 is continuous and does not have bubbles.

0.2 g (accurate to 0.1 mg) of sample is weighed and placed into a beaker of 25 mL, and 3 mL of n-heptane is added therein to dissolve the sample completely. Then an injector is used to smoothly and quickly extract all the dispersed mixtures as much as possible. The injector and filter disc 4 are inserted into the flow path as shown in FIG. 1. The filter disc 4 is fixed in a vertical position, and the post-column flow path switching valve 8 is switched to a position where the solvent passes through the chromatography column 6. Push the injector slowly and evenly to make the sample dispersed in n-heptane flow into the chromatographic column 6 through the filter disc 4. Then the injector is disconnected is disconnected. 1 mL of n-heptane is added into the beaker which is shaken well. An injector is used to suck the flushing liquid into the chromatographic column 6 through the filter disc 4.

Four receiving containers A, B, C, and D are dried at 100° C. for 30 min, and cooled in the desiccator. The empty weights $m_A$, $m_B$, $m_C$, $m_D$ (accurate to 0.1 mg) of the receiving containers A, B, C and D are measured, and then the receiving containers A, B, C and D are placed in the receiving apparatus 9. The temperature of heating component 18 increases to 70° C. N-heptane is used to elute at a flow rate of 1 mL/min for 40 min, and the container A is used to receive the effluent which is saturates of the sample. The pre-column flow path switching valve 5 and the post-column flow path switching valve 8 are switched to make the flow path directly enter the receiving container 16 without passing through the chromatographic column 6. The toluene is used to elute at a rate of 1.5 mL/min for 15 min, and container B is used to receive the eluent which is asphaltenes of the sample. The pre-column flow path switching valve 5 and the post-column flow path switching valve 8 is switched to make the flow path pass through the chromatographic column 6. The toluene is used to elute at a flow rate of 1.5 mL/min for 15 min, and container C is used to receive the eluent which is aromatics of the sample. The toluene/ethanol with a ratio of 1:1, toluene and ethanol are used to elute successively at the flow rate of 1.5 mL/min for 6 min each, and container D is used to receive the eluent which is resins of the sample. Solvent removal and constant weight: stop the elution and keep the temperature of the receiving apparatus 9 unchanged until the solvent in the receiving container 16 is completely evaporated; and take out the four receiving containers A, B, C, D, and cool them to a room temperature in a desiccator. The fraction-containing weights $M_A$, $M_B$, $M_C$, $M_D$ (accurate to 0.1 mg) are measured. The contents of saturates, aromatics, resins and asphaltenes can be calculated by using the following equations:

$$w_S = \frac{M_A - m_A}{m} \times 100\%$$

$$w_A = \frac{M_C - m_C}{m} \times 100\%$$

$$w_R = \frac{M_D - m_D}{m} \times 100\%$$

$$w_{As} = \frac{M_B - m_B}{m} \times 100\%$$

where, m is the mass of the sample, g;
$w_S$ is the mass fraction of saturates, %;
$w_A$ is the mass fraction of aromatics, %;
$w_R$ is the mass fraction of resins, %;
$w_{As}$ is the mass fraction of asphaltenes, %;
$m_A$, $m_B$, $m_C$, and $M_D$ are empty weights of containers A, B, C, and D, g;
$M_A$, $M_B$, $M_C$, and $M_D$ are fraction-containing weights of containers A, B, C, and D, g.

The above operation processes can be completed within 4 h. About 60 mL of n-heptane, 70 mL of toluene, 23 mL of ethanol are used for each sample. Manually operations are only needed during the sample loading and weighing. A parallel experiment with four paths is performed with the atmospheric residue of Saudi light crude oil being selected as the low asphaltenes samples and the vacuum residue of Basra crude oil being selected as the high asphaltenes samples respectively, and average values and relative standard deviations are calculated. The results are shown in the table below:

TABLE 1

Results of measurement of four fractions of heavy oil using an automatic separation apparatus for four fractions of heavy oil in Embodiment 1

| | Low asphaltenes samples | | High asphaltenes samples | |
| --- | --- | --- | --- | --- |
| fraction | average value (%) | standard deviation (%) | average value (%) | standard deviation (%) |
| saturates | 46.7 | 0.81 | 8.2 | 0.21 |
| aromatics | 31.2 | 0.52 | 43.3 | 0.42 |
| resins | 20.8 | 0.35 | 27.3 | 0.30 |
| asphaltenes | 1.2 | 0.04 | 21.1 | 0.22 |

Embodiment 2

In this embodiment, the same structure of the separation apparatus for four fractions of heavy oil as that in Embodiment 1 which is shown in FIG. 1 is used. The same elements or operation steps are not repeated here. The difference between this embodiment and Embodiment 1 is as follows.

In this embodiment, a glass fiber filter disc with a filter membrane having a pore size of 0.1 μm and an alumina chromatographic column with a capacity of 2 g, a column tube inner diameter of 8 mm and a column bed length of 50 mm are used, wherein a packing density of alumina is 0.8 g/mL. A mass of alumina particles having a particle size of 60 microns-200 microns accounts for 60% of the total mass, the specific surface area is 197 m$^2$/g, and the pore volume is 0.29 mL/g in the alumina.

In the liquid splitting apparatus in this embodiment, the solvent is preheated to 40° C. The material of the metal pipe is 316 stainless steel, and the metal pipe is a pipeline with an inner diameter of 0.05 mm and a length-to-diameter ratio of 50000:1.

In this embodiment, a sample cup made of aluminum-plastic material with a thickness of 0.1 mm and a capacity of 10 mL is used as the receiving container 16 in receiving apparatus 9.

The column oven 10 of the instrument is heated to 40° C., and the temperature of heating component 18 of the sample receiving apparatus 9 increases to 40° C. The chromatographic column 6 is wetted with n-hexane and the flushing is stopped until the effluent from the outlet of the liquid channel 20 of the receiving apparatus 9 is continuous and does not have bubbles.

0.1 g (accurate to 0.1 mg) of the sample is weighed and placed into a beaker of 10 mL and 1 mL of n-hexane is added therein to dissolve the sample completely. Then an injector is used to smoothly and quickly extract all the dispersed mixtures as much as possible. The injector and filter disc 4 are inserted into the flow path as shown in FIG. 1. The filter disc 4 is fixed in a vertical position, and the post-column flow path switching valve 8 is switched to a position where the solvent passes through the chromatography column 6. Push the injector slowly and evenly to make the sample dispersed in n-hexane flow into the chromatographic column 6 through the filter disc 4. Then the injector is disconnected. 1 mL of n-hexane is added into the beaker which is shaken well. An injector is used to suck the flushing liquid into the chromatographic column 6 through the filter disc 4.

Four receiving containers A, B, C, and D are dried at 100° C. for 30 min, and cooled in the desiccator. The empty weights $m_A$, $m_B$, $m_C$, $m_D$ (accurate to 0.1 mg) of the receiving containers A, B, C and D are measured, and then the receiving containers A, B, C and D are placed in the receiving apparatus 9. The temperature of heating component 18 increases to 40° C. N-hexane is used to elute at a flow rate of 0.5 mL/min for 5 min, and container A is used to receive the effluent which is saturates of the sample; and the pre-column flow path switching valve 5 and the post-column flow path switching valve 8 are switched to make the flow path directly enter the receiving container 16 without passing through the chromatographic column 6. The benzene is used to elute at a rate of 0.5 mL/min for 20 min, and container B is used to receive the eluent which is asphaltenes of the sample; and the pre-column flow path switching valve 5 and the post-column flow path switching valve 8 are switched to make the flow path pass through the chromatographic column 6. The benzene is used to elute at a flow rate of 0.5 mL/min for 5 min, and container C is used to receive the eluent which is aromatics of the sample. The benzene/ethanol with a ratio of 1:2, benzene and ethanol are used to elute successively at the flow rate of 0.5 mL/min for 5 min each, and container D is used to receive the eluent which is resins of the sample. Solvent removal and constant weight: stop the elution and keep the temperature of the receiving apparatus 9 unchanged until the solvent in the receiving container 16 is completely evaporated, take out the four receiving containers A, B, C, D, and cool them to a room temperature in a desiccator. The fraction-containing weights $M_A$, $M_B$, $M_C$, $M_D$ (accurate to 0.1 mg) are measured. The contents of saturates, aromatics, resins and asphaltenes are calculated by using the following equations:

$$w_S = \frac{M_A - m_A}{m} \times 100\%$$

$$w_A = \frac{M_C - m_C}{m} \times 100\%$$

$$w_R = \frac{M_D - m_D}{m} \times 100\%$$

$$w_{As} = \frac{M_B - m_B}{m} \times 100\%$$

where,
m is the mass of the sample, g;
$w_S$ is the mass fraction of saturates, %;
$w_A$ is the mass fraction of aromatics, %;
$w_R$ is the mass fraction of resins, %;
$w_{As}$ is the mass fraction of asphaltenes, %;
$m_A$, $m_B$, $m_C$, and $m_D$ are the empty weights of containers A, B, C, and D, g;
$M_A$, $M_B$, $M_C$, and $M_D$ are the fraction-containing weights of containers A, B, C, and D, g.

The above operation processes can be completed within 4 h. About 4.5 mL of n-hexane, 16 mL of benzene, and 4 mL of methanol are used for each sample. Manually operations are only needed during the sample loading and weighing. A parallel experiment with four paths is performed with the atmospheric residue of Saudi light crude oil being selected as the low asphaltenes samples and the vacuum residue of Basra crude oil being selected as the high asphaltenes samples respectively, and average values and relative standard deviations are calculated. The results are shown in the table below:

TABLE 2

Results of measurement of four fractions of heavy oil using an automatic separation apparatus for four fractions of heavy oil in Embodiment 2

| Fractions | Low asphaltenes samples | | High asphaltenes samples | |
|---|---|---|---|---|
| | Average value (%) | Standard deviation (%) | Average value (%) | Standard deviation (%) |
| Saturates | 45.2 | 1.5 | 7.9 | 0.35 |
| Aromatics | 32.0 | 0.67 | 43.6 | 1.12 |
| Resins | 20.7 | 0.80 | 26.8 | 0.65 |
| Asphaltenes | 1.6 | 0.07 | 21.7 | 0.65 |

Embodiment 3

In this embodiment, the same structure of the separation apparatus for four fractions of heavy oil as that in Embodiment 1 which is shown in FIG. 1 is used. The same elements or operation steps are not repeated here. The difference between this embodiment and Embodiment 1 is as follows.

In this embodiment, a glass fiber filter disc with a filter membrane having a pore size of 2.0 μm and an alumina chromatographic column with a capacity of 20 g, a column tube inner diameter of 13 mm and a column bed length of 130 mm are used, wherein the packing density of alumina is 1.2 g/mL. A mass of alumina particles with a particle size of 60 microns-200 microns accounts for 79% of the total mass, the specific surface area is 152 m²/g, and the pore volume is 0.26 mL/g in the alumina.

In the liquid splitting apparatus in this embodiment, the solvent is preheated to 60° C. The material of the metal pipe is 316 stainless steel, and the metal pipe is a pipeline with an inner diameter of 0.5 mm and a length-to-diameter ratio of 5000.

In this embodiment, a sample cup made of aluminum-plastic material with a thickness of 1 mm and a capacity of 50 mL is used as the receiving container 16 in receiving apparatus 9.

The column oven 10 of the instrument is heated to 40° C., and the temperature of heating component 18 of the sample receiving apparatus 9 increases to 60° C. The chromatographic column 6 is wetted with n-hexane and the flushing is stopped until the effluent from the outlet of the liquid channel 20 of the receiving apparatus 9 is continuous and does not have bubbles.

0.2 g (accurate to 0.1 mg) of the sample is weighed and placed into a beaker of 10 mL and 1 mL of n-hexane is added therein to dissolve the sample completely. Then an injector is used to smoothly and quickly extract all the dispersed mixtures as much as possible. The injector and filter disc 4 are inserted into the flow path as shown in FIG. 1. The filter disc 4 is fixed in a vertical position, and the post-column flow path switching valve 8 is switched to a position where the solvent passes through the chromatography column 6. Push the injector slowly and evenly to make the sample dispersed in n-hexane flow into the chromatographic column 6 through the filter disc 4. Then the injector is disconnected. 1 mL of n-hexane is added to the beaker which is shaken well. An injector is used to suck the flushing liquid into the chromatographic column 6 through the filter disc 4.

Four receiving containers A, B, C, and D are dried at 100° C. for 30 min, and cooled in the desiccator. The empty weights $m_A$, $m_B$, $m_C$, $m_D$ (accurate to 0.1 mg) of the receiving containers A, B, C and D are measured, and then the receiving containers A, B, C and D are placed in the receiving apparatus 9. The temperature of heating component 18 increases to 60° C. N-hexane is used to elute at a flow rate of 1 mL/min for 70 min, and container A is used to receive the effluent which is saturates of the sample; and the pre-column flow path switching valve 5 and the post-column flow path switching valve 8 are switched to make the flow path directly enter the receiving container 16 without passing through the chromatographic column 6. The toluene is used to elute at a rate of 1 mL/min for 30 min, and container B is used to receive the eluent which is asphaltenes of the sample; and the pre-column flow path switching valve 5 and the post-column flow path switching valve 8 are switched to make the flow path pass through the chromatographic column 6. The toluene is used to elute at a flow rate of 1 mL/min for 50 min, and container C is used to receive the eluent which is aromatics of the sample. The toluene/ethanol with a ratio of 2:1, toluene and ethanol are used to elute successively at the flow rate of 1.5 mL/min for 35 min each, and container D is used to receive the eluent which is resins of the sample. Solvent removal and constant weight: stop the elution and keep the temperature of the receiving apparatus 9 unchanged until the solvent in the receiving container 16 is completely evaporated, take out the four receiving containers A, B, C, D, and cool them to a room temperature in a desiccator. The fraction-containing weights $M_A$, $M_B$, $M_C$, $M_D$ (accurate to 0.1 mg) are measured. The contents of saturates, aromatics, resins and asphaltenes are calculated by using the following equations:

$$w_S = \frac{M_A - m_A}{m} \times 100\%$$

$$w_A = \frac{M_C - m_C}{m} \times 100\%$$

$$w_R = \frac{M_D - m_D}{m} \times 100\%$$

$$w_{As} = \frac{M_B - m_B}{m} \times 100\%$$

where,
m is the mass of the sample, g;
$w_S$ is the mass fraction of saturates, %;
$w_A$ is the mass fraction of aromatics, %;
$w_R$ is the mass fraction of resins, %;
$w_{As}$ is the mass fraction of asphaltenes, %;
$m_A$, $m_B$, $m_C$, and $m_D$ are the empty weights of containers A, B, C, and D, g;
$M_A$, $M_B$, $M_C$, and $M_D$ are the fraction-containing weights of containers A, B, C, and D, g.

The above operation process can be completed within 6 h. Manually operations are only needed during the sample loading and weighing. A parallel experiment with four paths is performed with the atmospheric residue of Saudi light crude oil being selected as the low asphaltenes samples and the vacuum residue of Basra crude oil being selected as the high asphaltenes samples respectively, and the average values and relative standard deviations are calculated. The results are shown in the table below:

TABLE 3

Results of measurement of four fractions of heavy oil using an automatic separation apparatus for four fractions of heavy oil in Embodiment 3

| Fractions | Low asphaltenes samples | | High asphaltenes samples | |
|---|---|---|---|---|
| | Average value (%) | Standard deviation (%) | Average value (%) | Standard deviation (%) |
| Saturates | 46.2 | 0.74 | 8.4 | 0.29 |
| Aromatics | 32.5 | 0.41 | 42.8 | 0.42 |
| Resins | 19.9 | 0.31 | 27 | 0.34 |
| Asphaltenes | 1.2 | 0.03 | 21.8 | 0.3 |

Embodiment 4

In this embodiment, the same structure of the separation apparatus for four fractions of heavy oil as that in Embodiment 1 which is shown in FIG. 1 is used. The same elements or operation steps are not repeated here. The difference between this embodiment and Embodiment 1 is as follows.

In this embodiment, a glass fiber filter disc with a filter membrane having a pore size of 50 μm and an alumina chromatographic column with a capacity of 20 g, a column tube inner diameter of 13 mm and a column bed length of 110 mm are used, wherein the packing density of alumina is 1.4 g/mL. A mass of alumina particles with a particle size of 60 microns-200 microns accounts for 65% of the total mass, the specific surface area is 166 m²/g, and the pore volume is 0.27 mL/g in the alumina.

The liquid splitting apparatus in this embodiment uses two three-way pipes with one inlet and two outlets as shown in FIG. 2, dividing the mobile phase into four paths. However, the liquid splitting apparatus does not include a heating module in this embodiment. The metal pipe is a pipeline with an inner diameter of 0.2 mm and a length-to-diameter ratio of 25000.

In this embodiment, a sample cup made of aluminum-plastic material with a thickness of 0.2 mm and a capacity of 30 mL is used as the receiving container 16 in receiving apparatus 9.

The column oven 10 of the instrument is heated to 60° C., and the temperature of heating component 18 of the sample receiving apparatus 9 increases to 100° C. The chromatographic column 6 is wetted with n-heptane and the flushing is stopped until the effluent from the outlet of the liquid channel 20 of the receiving apparatus 9 is continuous and does not have bubbles.

0.15 g (accurate to 0.1 mg) of the sample is weighed and placed into a beaker of 25 mL and 0.7 mL of n-hexane is added therein to dissolve the sample completely. Then an injector is used to smoothly and quickly extract all the dispersed mixtures as much as possible. The injector and filter disc 4 are inserted into the flow path as shown in FIG. 1. The filter disc 4 is fixed in a vertical position, and the post-column flow path switching valve 8 is switched to a position where the solvent passes through the chromatography column 6. Push the injector slowly and evenly to make the sample dispersed in n-heptane flow into the chromatographic column 6 through the filter disc 4. Then the injector is disconnected. 1 mL of n-heptane is added to the beaker which is shaken well. An injector is used to suck the flushing liquid into the chromatographic column through the filter disc 4.

Four receiving containers A, B, C, and D are dried at 100° C. for 30 min, and cooled in the desiccator. The empty weights $m_A$, $m_B$, $m_C$, $m_D$ (accurate to 0.1 mg) of the receiving containers A, B, C and D are measured, and then the receiving containers A, B, C and D are placed in the receiving apparatus 9. The temperature of heating component 18 increases to 100° C. N-heptane is used to elute at a flow rate of 1.5 mL/min for 90 min, and container A is used to receive the effluent which is saturates of the sample; and the pre-column flow path switching valve 5 and the post-column flow path switching valve 8 are switched to make the flow path directly enter the receiving container 16 without passing through the chromatographic column 6. The toluene is used to elute at a rate of 1.5 mL/min for 20 min, and container B is used to receive the eluent which is asphaltenes of the sample; and the pre-column flow path switching valve 5 and the post-column flow path switching valve 8 are switched to make the flow path pass through the chromatographic column 6. The toluene is used to elute at a flow rate of 1.5 mL/min for 15 min, and container C is used to receive the eluent which is aromatics of the sample; and the toluene/ethanol with a ratio of 3:2, toluene and ethanol are used to elute successively at the flow rate of 1.0 mL/min for 70 min each, and container D is used to receive the eluent which is resins of the sample. Solvent removal and constant weight: stop the elution and keep the temperature of the receiving apparatus 9 unchanged until the solvent in the receiving container 16 is completely evaporated, take out the four receiving containers A, B, C, D, and cool them to a room temperature in a desiccator. The fraction-containing weights $M_A$, $M_B$, $M_C$, $M_D$ (accurate to 0.1 mg) are measured. The contents of saturates, aromatics, resins and asphaltenes are calculated by using the following equations:

$$w_S = \frac{M_A - m_A}{m} \times 100\%$$

$$w_A = \frac{M_C - m_C}{m} \times 100\%$$

$$w_R = \frac{M_D - m_D}{m} \times 100\%$$

$$w_{As} = \frac{M_B - m_B}{m} \times 100\%$$

where, m is the mass of the sample, g;
$w_S$ is the mass fraction of saturates, %;
$w_A$ is the mass fraction of aromatics, %;
$w_R$ is the mass fraction of resins, %;
$w_{As}$ is the mass fraction of asphaltenes, %;
$m_A$, $m_B$, $m_C$, and $m_D$ are the empty weights of containers A, B, C, and D, g;
$M_A$, $M_B$, $M_C$, and $M_D$ are the fraction-containing weights of containers A, B, C, and D, g.

The elution time for each fraction will become longer without solvent preheating. However, the above operation processes can still be completed within 6 h, and for each sample, manual operations are only needed during the sample loading and weighing. A parallel experiment with four paths is performed with the atmospheric residue of Saudi light crude oil being selected as the low asphaltenes samples and the vacuum residue of Basra crude oil being selected as the high asphaltenes samples respectively, and the average values and relative standard deviations are calculated. The results are shown in the table below:

TABLE 4

Results of measurement of four fractions of heavy oil using an automatic separation apparatus for four fractions of heavy oil in Embodiment 4

| Fractions | Low asphaltenes samples | | High asphaltenes samples | |
| --- | --- | --- | --- | --- |
| | Average value (%) | Standard deviation (%) | Average value (%) | Standard deviation (%) |
| Saturates | 47.0 | 0.82 | 8.6 | 0.31 |
| Aromatics | 31.5 | 0.30 | 42.5 | 0.45 |
| Resins | 20.3 | 0.31 | 27.1 | 0.38 |
| Asphaltenes | 1.2 | 0.02 | 21.7 | 0.32 |

Embodiment 5

This embodiment is similar to Embodiment 2 described above. The same elements or operation steps are not repeated here. The difference between this embodiment and Embodiment 2 is as follows.

In this embodiment, the liquid splitting apparatus and the receiving apparatus are not used, and the elution in only one path is performed at a time.

In this embodiment, a glass beaker of 25 mL is used as the receiving container 16. The receiving container 16 is replaced manually whenever the receiving of one fraction is competed.

The pipelines between the sample loading apparatus 3 and the pre-column flow path switching valve 5 in FIG. 1 are directly connected without attaching the filter disc 4 therein. The chromatographic column 6 is fitted and fixed in a vertical position. The column oven of the instrument is heated to 40° C. The chromatographic column 6 is wetted with n-heptane and the flushing is stopped until the effluent from the outlet of the liquid channel of the automatic receiving apparatus for eluent is continuous and does not have bubbles.

0.1 g (accurate to 0.1 mg) of the sample is weighed and placed into a beaker of 10 mL and 0.8 mL of n-hexane is added therein to dissolve the sample completely. Then an injector is used to smoothly and quickly extract all the dispersed mixtures as much as possible. The injector and filter disc 4 are inserted into the flow path as shown in FIG. 1. The filter disc 4 is fixed in a vertical position, and the post-column flow path switching valve 8 is switched to a position where the solvent passes through the chromatography column 6. Push the injector slowly and evenly to make the sample dispersed in n-hexane flow into the chromatographic column 6 through the filter disc 4. Then the injector is disconnected. 1 mL of n-heptane is added to the beaker which is shaken well. An injector is used to suck the flushing liquid into the chromatographic column 6 through the filter disc 4.

Four receiving containers A, B, C, and D are dried at 100° C. for 30 min, and cooled in the desiccator. The empty weights $m_A$, $m_B$, $m_C$, $m_D$ (accurate to 0.1 mg) are measured. N-heptane is used to elute at a flow rate of 1.0 mL/min for 10 min, and container A is used to receive the effluent which is saturates of the sample; and the pre-column flow path switching valve 5 and the post-column flow path switching valve 8 are switched to make the flow path directly enter the receiving container 16 without passing through the chromatographic column 6. The benzene is used to elute at a rate of 0.5 mL/min for 25 min, and container B is used to receive the eluent which is asphaltenes of the sample; and pre-column flow path switching valve 5 and the post-column flow path switching valve 8 are switched to make the flow path pass through the chromatographic column 6. The benzene is used to elute at a flow rate of 0.5 mL/min for 7 min, and container C is used to receive the eluent which is aromatics of the sample. The benzene/ethanol with a ratio of 1:2, benzene and ethanol are used to elute successively at the flow rate of 0.5 mL/min for 7 min each, and container D is used to receive the eluent which is resins of the sample. The received fractions are rotary evaporated to remove the solvent, then dried in a vacuum oven and weighed. The fraction-containing weights $M_A$, $M_B$, $M_C$, $M_D$ (accurate to 0.1 mg) are measured. The contents of saturates, aromatics, resins and asphaltenes are calculated by using the following equations:

$$w_S = \frac{M_A - m_A}{m} \times 100\%$$

$$w_A = \frac{M_C - m_C}{m} \times 100\%$$

$$w_R = \frac{M_D - m_D}{m} \times 100\%$$

$$w_{As} = \frac{M_B - m_B}{m} \times 100\%$$

where,
m is the mass of the sample, g;
$w_S$ is the mass fraction of saturates, %;
$w_A$ is the mass fraction of aromatics, %;
$w_B$ is the mass fraction of resins, %;
$w_{As}$ is the mass fraction of asphaltenes, %;

$m_A$, $m_B$, $m_C$, and $m_D$ are the empty weights of containers A, B, C, and D, g;
$M_A$, $M_B$, $M_C$, and $M_D$ are the fraction-containing weights of containers A, B, C, and D, g.

The above operation processes can be completed within 5 h. Manually operations are only needed during the sample loading, sample receiving, solvent removal and weighing. A parallel experiment with four paths is performed with the atmospheric residue of Saudi light crude oil being selected as the low asphaltenes samples and the vacuum residue of Basra crude oil being selected as the high asphaltenes samples respectively, and the average values and relative standard deviations are calculated. The results are shown in the table below:

TABLE 5

Results of measurement of four fractions of heavy oil using an automatic separation apparatus for four fractions of heavy oil in Embodiment 5

| Fractions | Low asphaltenes samples | | High asphaltenes samples | |
| --- | --- | --- | --- | --- |
| | Average value (%) | Standard deviation (%) | Average value (%) | Standard deviation (%) |
| Saturates | 45.3 | 1.81 | 7.8 | 0.42 |
| Aromatics | 33.1 | 1.52 | 43.2 | 1.85 |
| Resins | 20.3 | 1.32 | 26.9 | 1.25 |
| Asphaltenes | 1.3 | 0.05 | 22 | 0.85 |

Compared with Embodiment 1, Embodiment 2, Embodiment 3 and Embodiment 4, the standard deviation measured in this embodiment is slightly larger, mainly because the used receiving container 16 is a glass beaker, which has a relatively large self-weight and brings relatively large weighing error.

Embodiment 6

In this embodiment, the same structure of the separation apparatus for four fractions of heavy oil as that in Embodiment 1 which is shown in FIG. 1 is used. The same elements or operation steps are not repeated here. The difference between this embodiment and Embodiment 1 is as follows.

In this embodiment, a glass fiber filter disc with a filter membrane having a pore size of 50 pin and an alumina chromatographic column with a capacity of 12 g, a column tube inner diameter of 13 mm and a column bed length of 65 mm are used, wherein the packing density of alumina is 1.4 g/mL. A mass of alumina particles having a particle size of 60 microns-200 microns accounts for 65% of the total mass, the specific surface area is 166 m$^2$/g, and the pore volume is 0.27 mL/g in the alumina.

In the liquid splitting apparatus in this embodiment, the heating element used is an oil bath heating apparatus which preheats the solvent to 60° C. The metal pipe is a pipeline with an inner diameter of 0.2 mm and a length-to-diameter ratio of 25000.

In this embodiment, a sample cup made of aluminum-plastic material with a thickness of 0.5 mm and a capacity of 50 mL is used as the receiving container 16 in receiving apparatus.

The column oven 10 of the instrument is not heated, and the temperature of heating component 18 of the sample receiving apparatus 9 increases to 100° C. The chromatographic column 6 is wetted with n-heptane and the flushing is stopped until the effluent from the outlet of the liquid channel 20 of the receiving apparatus 9 is continuous and does not have bubbles.

0.15 g (accurate to 0.1 mg) of the sample is weighed and placed into a beaker of 10 mL and 0.5 mL of n-hexane is added therein to dissolve the sample completely. Then an injector is used to smoothly and quickly extract all the dispersed mixtures as much as possible. The injector and filter disc 4 are inserted into the flow path as shown in FIG. 1. The filter disc 4 is fixed in a vertical position, and the post-column flow path switching valve 8 is switched to a position where the solvent passes through the chromatography column 6. Push the injector slowly and evenly to make the sample dispersed in n-heptane flow into the chromatographic column 6 through the filter disc 4. Then the injector is disconnected. 0.5 mL of n-heptane is added to the beaker which is shaken well. An injector is used to suck the flushing liquid into the chromatographic column 6 through the filter disc 4.

Four receiving containers A, B, C, and D are dried at 100° C. for 30 min, and cooled in the desiccator. The empty weights $m_A$, $m_B$, $m_C$, $m_D$ (accurate to 0.1 mg) of the receiving containers A, B, C and D are measured, and then the receiving containers A, B, C and D are placed in the receiving apparatus 9. The temperature of heating component 18 increases to 100° C. N-heptane is used to elute at a flow rate of 1.5 mL/min for 35 min, and container A is used to receive the effluent which is saturates of the sample; and the pre-column flow path switching valve 5 and the post-column flow path switching valve 8 are switched to make the flow path directly enter the receiving container 16 without passing through the chromatographic column 6. The toluene is used to elute at a rate of 1.5 mL/min for 20 min, and container B is used to receive the eluent which is asphaltenes of the sample; and the pre-column flow path switching valve 5 and the post-column flow path switching valve 8 are switched to make the flow path pass through the chromatographic column 6. The toluene is used to elute at a flow rate of 1.5 mL/min for 15 min, and container C is used to receive the eluent which is aromatics of the sample. The toluene/ethanol with a ratio of 1:1, toluene and ethanol are used to elute successively at the flow rate of 1.0 mL/min for 25 min each, and container D is used to receive the eluent which is resins of the sample. Solvent removal and constant weight: stop the elution and keep the temperature of the receiving apparatus 9 unchanged until the solvent in the receiving container 16 is completely evaporated, take out the four receiving containers A, B, C, D, and cool them to a room temperature in a desiccator. The fraction-containing weights $M_A$, $M_B$, $M_C$, $M_D$ (accurate to 0.1 mg) are measured. The contents of saturates, aromatics, resins and asphaltenes are calculated by using the following equations:

$$w_S = \frac{M_A - m_A}{m} \times 100\%$$

$$w_A = \frac{M_C - m_C}{m} \times 100\%$$

$$w_R = \frac{M_D - m_D}{m} \times 100\%$$

$$w_{As} = \frac{M_B - m_B}{m} \times 100\%$$

where,
m is the mass of the sample, g;
$w_S$ is the mass fraction of saturates, %;
$w_A$ is the mass fraction of aromatics, %;
$w_R$ is the mass fraction of resins, %;
$w_{As}$ is the mass fraction of asphaltenes, %;
$m_A$, $m_B$, $m_C$, and $m_D$ are empty weights of containers A, B, C, and D, g;
$M_A$, $M_B$, $M_C$, and $M_D$ are fraction-containing weights of containers A, B, C, and D, g.

The elution time for each fraction will become longer without column oven being heated. However, the above operation processes can still be completed within 6 h, and for each sample, manual operations are only needed during the sample loading and weighing. A parallel experiment with four paths is performed with the atmospheric residue of Saudi light crude oil being selected as the low asphaltenes samples and the vacuum residue of Basra crude oil being selected as the high asphaltenes samples respectively, and the average values and relative standard deviations are calculated. The results are shown in the table below:

TABLE 6

Results of measurement of four fractions of heavy oil using an automatic separation apparatus for four fractions of heavy oil in Embodiment 6

| Fractions | Low asphaltenes samples | | High asphaltenes samples | |
|---|---|---|---|---|
| | Average value (%) | Standard deviation (%) | Average value (%) | Standard deviation (%) |
| Saturates | 46.5 | 0.75 | 8.2 | 0.38 |
| Aromatics | 31.8 | 0.56 | 42.8 | 0.97 |
| Resins | 20.4 | 0.25 | 27 | 0.52 |
| Asphaltenes | 1.3 | 0.02 | 21.9 | 0.36 |

Embodiment 7

In this embodiment, the same structure of the separation apparatus for four fractions of heavy oil as that in Embodiment 1 which is shown in FIG. 1 is used. The same elements or operation steps are not repeated here. The difference between this embodiment and Embodiment 1 is as follows.

In this embodiment, a glass fiber filter disc with a filter membrane having a pore size of 0.05 μm and an alumina chromatographic column with a capacity of 20 g, a column tube inner diameter of 13 mm and a column bed length of 110 mm are used, wherein the packing density of alumina is 1.4 g/mL. A mass of alumina particles having a particle size of 60 microns-200 microns accounts for 65% of the total mass, the specific surface area is 166 m²/g, and the pore volume is 0.27 mL/g in the alumina.

The liquid splitting apparatus in this embodiment uses two three-way pipes with one inlet and two outlets as the splitter. As shown in FIG. 2, the mobile phase can be split into four paths, and the heating module used is the metal heater that conducts heat in direct contact with the metal to preheat the solvent to 60° C. The metal pipe is the pipeline with an inner diameter of 0.2 mm and a length-to-diameter ratio of 25000.

In this embodiment, a sample cup made of aluminum-plastic material with a thickness of 0.2 mm and a capacity of 30 mL is used as the receiving container 16 in receiving apparatus 9.

The column oven 10 of the instrument is heated to 60° C., and the temperature of heating component 18 of the sample receiving apparatus 9 increases to 100° C. The chromatographic column 6 is wetted with n-heptane and the flushing is stopped until the effluent from the outlet of the liquid channel 20 of the receiving apparatus 9 is continuous and does not have bubbles.

0.15 g (accurate to 0.1 mg) of the sample is weighed and placed into a beaker of 25 mL and 0.7 mL of n-hexane is added therein to dissolve the sample completely. Then an injector is used to smoothly and quickly extract all the dispersed mixtures as much as possible. The injector and filter disc 4 are inserted into the flow path as shown in FIG. 1. The filter disc 4 is fixed in a vertical position, and the post-column flow path switching valve 8 is switched to a position where the solvent passes through the chromatography column 6. Push the injector slowly and evenly to make the sample dispersed in n-heptane flow into the chromatographic column 6 through the filter disc 4. Then the injector is disconnected. 1 mL of n-heptane is added to the beaker which is shaken well. An injector is used to suck the flushing liquid into the chromatographic column 6 through the filter disc 4.

Four receiving containers A, B, C, and D are dried at 100° C. for 30 min, and cooled in the desiccator. The empty weights $m_A$, $m_B$, $m_C$, $m_D$ (accurate to 0.1 mg) of the receiving containers A, B, C and D are measured, and then the receiving containers A, B, C and D are placed in the receiving apparatus 9. The temperature of heating component 18 increases to 100° C. N-heptane is used to elute at a flow rate of 1.5 mL/min for 90 min, and container A is used to receive the effluent which is saturates of the sample; and the pre-column flow path switching valve 5 and the post-column flow path switching valve 8 are switched to make the flow path directly enter the receiving container 16 without passing through the chromatographic column 6. The toluene is used to elute at a rate of 0.5 mL/min for 60 min, and container B is used to receive the eluent which is asphaltenes of the sample; and the pre-column flow path switching valve 5 and the post-column flow path switching valve 8 are switched to make the flow path pass through the chromatographic column 6. The toluene is used to elute at a flow rate of 1.5 mL/min for 15 min, and container C is used to receive the eluent which is aromatics of the sample. The toluene/ethanol with a ratio of 3:2, toluene and ethanol are used to elute successively at the flow rate of 1.0 mL/min for 20 min each, and container D is used to receive the eluent which is resins of the sample. Solvent removal and constant weight: stop the elution and keep the temperature of the receiving apparatus 9 unchanged until the solvent in the receiving container 16 is completely evaporated, take out the four receiving containers A, B, C, D, and cool them to a room temperature in a desiccator. The fraction-containing weights $M_A$, $M_B$, $M_C$, $M_D$ (accurate to 0.1 mg) are measured. The contents of saturates, aromatics, resins and asphaltenes are calculated by using the following equations:

$$w_S = \frac{M_A - m_A}{m} \times 100\%$$

$$w_A = \frac{M_C - m_C}{m} \times 100\%$$

$$w_R = \frac{M_D - m_D}{m} \times 100\%$$

$$w_{As} = \frac{M_B - m_B}{m} \times 100\%$$

where, m is the mass of the sample, g;

$w_S$ is the mass fraction of saturates, %;

$w_A$ is the mass fraction of aromatics, %;

$w_R$ is the mass fraction of resins, %;

$w_{As}$ is the mass fraction of asphaltenes, %;

$m_A$, $m_B$, $m_C$, and $m_D$ are the empty weights of containers A, B, C, and D, g;

$M_A$, $M_B$, $M_C$, and $M_D$ are the fraction-containing weights of containers A, B, C, and D, g.

Since the filter membrane of the filter disc used in this embodiment has a small pore size, the back pressure brought by the separation of high asphaltenes samples is relatively large, and it needs to be flushed with toluene at a low flow rate and for a long time. However, the above operation processes can still be completed within 5 h, and for each sample, manual operations are only needed during the sample loading and weighing. A parallel experiment with four paths is performed with the atmospheric residue of Saudi light crude oil being selected as the low asphaltenes samples and the vacuum residue of Basra crude oil being selected as the high asphaltenes samples respectively, and the average values and relative standard deviations are calculated. The results are shown in the table below:

TABLE 7

Results of measurement of four fractions of heavy oil using an automatic separation apparatus for four fractions of heavy oil in Embodiment 7

| Fractions | Low asphaltenes samples | | High asphaltenes samples | |
| --- | --- | --- | --- | --- |
| | Average value (%) | Standard deviation (%) | Average value (%) | Standard deviation (%) |
| Saturates | 46.8 | 0.81 | 8.6 | 0.86 |
| Aromatics | 31.8 | 0.53 | 42.4 | 0.43 |
| Resins | 20 | 0.42 | 26.8 | 0.65 |
| Asphaltenes | 1.4 | 0.05 | 22 | 0.53 |

Embodiment 8

In this embodiment, the same structure of the separation apparatus for four fractions of heavy oil as that in Embodiment 1 which is shown in FIG. 1 is used. The same elements or operation steps are not repeated here. The difference between this embodiment and Embodiment 1 is as follows.

In this example, a glass fiber filter disc with a filter membrane having a pore size of 2.0 μm and a commercially available silica gel medium-pressure chromatographic column (Agela Technologies, Claricep Flash column) with a specific surface area of 480 m²/g, a pore size of 60 Å, pH value of 6.3-7.2, water content of 3%-5%, and an average particle size of 40 μm-60 μm.

In the liquid splitting apparatus in this embodiment, the solvent is preheated to 60° C. The material of the metal pipe is 316 stainless steel, and the metal pipe is a pipeline with an inner diameter of 0.5 mm and a length-to-diameter ratio of 5000.

In this embodiment, a sample cup made of aluminum-plastic material with a thickness of 0.2 mm and a capacity of 50 mL is used as the receiving container in the receiving apparatus.

The column oven 10 of the instrument is heated to 40° C., and the temperature of heating component 18 of the sample receiving apparatus 9 increases to 60° C. The chromatographic column 6 is wetted with n-hexane and the flushing is stopped until the effluent from the outlet of the liquid channel 20 of the receiving apparatus 9 is continuous and does not have bubbles.

0.1 g (accurate to 0.1 mg) of the sample is weighed and placed into a beaker of 10 mL and 1 mL of n-hexane is added therein to dissolve the sample completely. Then an injector is used to smoothly and quickly extract all the dispersed mixtures as much as possible. The injector and filter disc 4 are inserted into the flow path as shown in FIG. 1. The filter disc 4 is fixed in a vertical position, and the post-column flow path switching valve 8 is switched to a position where the solvent passes through the chromatography column 6. Push the injector slowly and evenly to make the sample dispersed in n-hexane flow into the chromatographic column 6 through the filter disc 4. Then the injector is disconnected. 1 mL of n-hexane is added to the beaker which is shaken well. An injector is used to suck the flushing liquid into the chromatographic column 6 through the filter disc 4.

Four receiving containers A, B, C, and D are dried at 100° C. for 30 min, and cooled in the desiccator. The empty weights $m_A$, $m_B$, $m_C$, $m_D$ (accurate to 0.1 mg) of the receiving containers A, B, C and D are measured, and then the receiving containers A, B, C and D are placed in the receiving apparatus 9. The temperature of heating component 18 increases to 60° C. N-hexane is used to elute at a flow rate of 1 mL/min for 15 min, and container A is used to receive the effluent which is saturates of the sample, and the pre-column flow path switching valve 5 and the post-column flow path switching valve 8 are switched to make the flow path directly enter the receiving container 16 without passing through the chromatographic column 6. The toluene is used to elute at a rate of 1 mL/min for 20 min, and container B is used to receive the eluent which is asphaltenes of the sample; and the pre-column flow path switching valve 5 and the post-column flow path switching valve 8 are switched to make the flow path pass through the chromatographic column 6. The toluene is used to elute at a flow rate of 1 mL/min for 15 min, and container C is used to receive the eluent which is aromatics of the sample. The toluene/ethanol with a ratio of 2:1, toluene and ethanol are used to elute successively at the flow rate of 1.5 mL/min for 10 min each, and container D is used to receive the eluent which is resins of the sample. Solvent removal and constant weight: stop the elution and keep the temperature of the receiving apparatus 9 unchanged until the solvent in the receiving container 16 is completely evaporated, take out the four receiving containers A, B, C, D, and cool them to a room temperature in a desiccator. The fraction-containing weights $M_A$, $M_B$, $M_C$, $M_D$ (accurate to 0.1 mg) are measured. The contents of saturates, aromatics, resins and asphaltenes are calculated by using the following equations:

$$w_S = \frac{M_A - m_A}{m} \times 100\%$$

$$w_A = \frac{M_C - m_C}{m} \times 100\%$$

$$w_R = \frac{M_D - m_D}{m} \times 100\%$$

$$w_{As} = \frac{M_B - m_B}{m} \times 100\%$$

where,
m is the mass of the sample, g;
$w_S$ is the mass fraction of saturates, %;
$w_A$ is the mass fraction of aromatics, %;
$w_B$ is the mass fraction of resins, %;
$w_{As}$ is the mass fraction of asphaltenes, %;
$m_A$, $m_B$, $m_C$, and $m_D$ are the empty weights of containers A, B, C, and D, g;
$M_A$, $M_B$, $M_C$, and $M_D$ are the fraction-containing weights of containers A, B, C, and D, g.

The above operation processes can be completed within 4 h. Manually operations are only needed during the sample loading and weighing. A parallel experiment with four paths is performed with the atmospheric residue of Saudi light crude oil being selected as the low asphaltenes samples and the vacuum residue of Basra crude oil being selected as the high asphaltenes samples respectively, and the average values and relative standard deviations are calculated. The results are shown in the table below:

TABLE 8

Results of measurement of four fractions of heavy oil using an automatic separation apparatus for four fractions of heavy oil in Embodiment 8

| Fractions | Low asphaltenes samples | | High asphaltenes samples | |
|---|---|---|---|---|
| | Average value (%) | Standard deviation (%) | Average value (%) | Standard deviation (%) |
| Saturates | 48.7 | 0.83 | 9.3 | 0.85 |
| Aromatics | 30.9 | 1.21 | 42.1 | 1.35 |
| Resins | 18.8 | 0.62 | 26.8 | 0.82 |
| Asphaltenes | 1.2 | 0.03 | 21.8 | 0.26 |

Compared with Embodiment 1 to Embodiment 7, the measurement results obtained by using the commercially available chromatographic column show high contents of saturates and low contents of aromatics, and the precision is slightly worse. The standard deviation of the measurement in this embodiment is slightly bigger.

Comparative Embodiment 1

The main steps of current standard method SH/T 0509 include: (1) preparation of packing materials of alumina chromatography column: it is necessary to activate commercially available alumina at 500° C. for 6 h, then add 1% water, shake vigorously and let them stand for 24 h, and the validity period is only one week; (2) separation of asphaltenes: the sample needs to be heated and refluxed in n-heptane for 0.5 h-1 h, left for 1 h and filtered, and the container needs to be flushed with hot n-heptane several times, then the filter paper with precipitation needs to be refluxed with n-heptane for 1 h, then refluxed and extracted with toluene for 1 h, finally the toluene extract is evaporated and dried to a constant weight to obtain the content of asphaltenes; (3) packing of the chromatography column: the alumina prepared in step (1) needs to be added to a glass adsorption column tube, and the column tube needs to be tapped continuously to be packed tightly; (4) separation of saturates, aromatics and resins: firstly, it is pre-wetted with n-heptane, then the non-asphaltenes solution obtained in step (2) is added therein, and then it is eluted with n-heptane, toluene, toluene-ethanol respectively to obtain the saturates, aromatics and resins; and (5) weighing each fraction: firstly, the solution of each fraction obtained in step (4) is distilled by distillation apparatus to remove most of the solvent, and then placed in a vacuum oven for 1 h, taken out, cooled and weighed.

According to the current standard method SH/T 0509, it takes about 15 h to measure one sample and consumes 160 mL of n-heptane, 200 mL of toluene, and 60 mL of ethanol. The manual operations are required during the entire process. It can be seen that, by using the automatic separation apparatus for four fractions of heavy oil in the present disclosure, the time required for the separation measurement of four fractions, as well as the consumption of solvents and labor can be greatly reduced.

Using the same two samples as in Embodiment 1, the four fractions of heavy oil are measured in accordance with SH/0509, and each sample is tested four times in parallel. The average values and relative standard deviations are calculated, and the results are shown in the following table:

TABLE 9

Results of measurement of four fractions of heavy oil in accordance with SH/0509

| Fractions | Low asphaltenes samples | | High asphaltenes samples | |
| --- | --- | --- | --- | --- |
| | Average value (%) | Standard deviation (%) | Average value (%) | Standard deviation (%) |
| Saturates | 46.9 | 2.65 | 8.0 | 0.62 |
| Aromatics | 28.8 | 3.10 | 45.1 | 3.21 |
| Resins | 21.7 | 3.06 | 28.3 | 3.75 |
| Asphaltenes | 1.2 | 0.06 | 18.5 | 1.0 |

It can be seen that the results of measurement of the four fractions of heavy oil according to SH/0509 are substantially the same as those in Embodiment 1, but the standard deviation of the results obtained by using SH/0509 is significantly larger, which demonstrates that compared with the current standard method with manual operations, the use of the automatic separation apparatus for four fractions of heavy oil of the present disclosure can greatly save time and solvent consumption, reduce manual-induced operating errors, reduce deviations, and improve the precision of separation measurement, such that the reproducibility of the separation determination is better.

Comparative Embodiment 2

Using the commercially available BN118 automatic four fractions of heavy oil analyzer produced by Dalian Bangneng Petroleum Instrument Co., Ltd., on the basis of the current standard method SH/T 0509, the step of adding solvent by manual are changed to the step of extracting the solvent from the solvent reservoir tank by using a pump and flushing the chromatographic column. In addition, a group of glass conical flasks that can automatically control the receiving position are provided directly below the chromatographic column as the receiving apparatus. The other steps are still operated according to the standard method SH/T 0509. Since the elution process and chromatographic column are substantially the same as those of SH/T 0509, the amount of solvent consumed is also equivalent, that is, 160 mL of n-heptane, 200 mL of toluene, and 60 mL of ethanol. Since manual operations of separating asphaltenes and solvent removal are still required, a large amount of labor is still required, and the entire process still takes about 10 h. It can be seen that, by using the design of online separation of asphaltenes, the design of automatic solvent receiving and simultaneous heating and evaporation, and the new type of chromatographic column in the present disclosure, the time required for the separation measurement of the four fractions, as well as the consumption of solvents and labor can be greatly reduced.

Using the same two samples as those in Embodiment 1, the four fractions of heavy oil are measured similarly, and each sample is tested four times in parallel. The average values and relative standard deviations are calculated and the results are shown in the following table:

TABLE 10

Results of measurement of four fractions of heavy oil in accordance with BN118

| Fractions | Low asphaltenes samples | | High asphaltenes samples | |
| --- | --- | --- | --- | --- |
| | Average value (%) | Standard deviation (%) | Average value (%) | Standard deviation (%) |
| Saturates | 47.5 | 2.55 | 9.0 | 0.65 |
| Aromatics | 29.9 | 3.05 | 44.1 | 3.10 |
| Resins | 21.2 | 3.10 | 28.6 | 3.45 |
| Asphaltenes | 1.3 | 0.06 | 17.5 | 1.1 |

It can be seen that the results of measurement of the four fractions of heavy oil according to BN118 are substantially the same as those in Embodiment 1, but the standard deviation of the results obtained by using BN118 is significantly larger, which demonstrates that compared with the current automatic analyzer for four fractions of heavy oil, the use of the automatic separation apparatus for four fractions of heavy oil of the present disclosure can greatly save time and solvent consumption, reduce manual-induced operating errors, reduce deviations, and improve the precision of separation and measurement, such that the reproducibility of the separation determination is better.

It can be seen from the above embodiments and comparative embodiments that the application of the automatic separation apparatus for four fractions of heavy oil in the present disclosure can automatically separate asphaltenes online, automatically receive saturates, aromatics, and resins, and remove the solvent therefrom. In the separation process for four fractions, the steps operated by manual are reduced, which greatly saves time and solvent consumption, and can also reduce manual-induced operating errors, reduce deviations, and improve the precision of separation measurement. Of course, the present disclosure can also have various other embodiments. Without departing from the spirit and essence of the present disclosure, those skilled in the art can make various corresponding changes and variations according to the present disclosure, but these corresponding changes and variations shall fall into the protection scope of the present disclosure.

The foregoing descriptions are merely illustrative specific implementations of the present disclosure, and are not used to define the scope of the present disclosure. Any equivalent changes and modifications made by any person skilled in the art without departing from the concept and principle of the present disclosure shall fall within the protection scope of the present disclosure. Moreover, it should be noted that the various components of the present disclosure are not only limited with the above-mentioned overall application. Each technical feature described in the specification of the present disclosure can be selected individually or used in combination according to actual needs. Therefore, the present disclosure naturally covers other combinations and specific applications related to the inventive concept of this case.

What is claimed is:

1. An automatic separation apparatus for four fractions of heavy oil, comprising:
   (a) a solvent reservoir tank;
   (b) a separation unit for the four fractions of heavy oil, comprising:
      (i) a filter disc having one end in communication with the solvent reservoir tank, and an opposing end in communication with a first inlet of a pre-column flow path switching valve;
      (ii) a chromatographic column having an inlet in communication with a first outlet of the pre-column flow path switching valve, and an outlet in communication with a first inlet of a post-column flow path switching valve; and
      (iii) a bypass pipeline having one end in communication with a second outlet of the pre-column flow path switching valve, and an opposing end in communication with a second inlet of the post-column flow path switching valve;
   (c) a receiving apparatus in communication with an outlet of the post-column flow path switching valve;
   wherein a number of the separation unit for the four fractions of heavy oil is n, wherein n is an integer greater than or equal to 1, and the separation unit for the four fractions of heavy oil is used to perform automatic separation processes of the four fractions of heavy oil simultaneously in parallel;
   wherein the automatic separation apparatus for the four fractions of heavy oil further comprises: a liquid splitting apparatus comprising a heating element and being arranged between the solvent reservoir tank and the separation unit for the four fractions of heavy oil; the liquid splitting apparatus comprising a splitter and n paths of metal pipes with equal back pressures, the number of the metal pipes being equal to the number of separation units for the four fractions of heavy oil, and liquid outlet ends of respective metal pipes being in communication with liquid inlet ends of respective separation units for the four fractions of heavy oil in a one-to-one correspondence;
   wherein the receiving apparatus is an automatic receiving apparatus for eluent which is made of aluminum-plastic materials, comprising a box, a receiving container arranged in the box a transmission apparatus, and a liquid channel; and
   wherein the receiving container is arranged at a bottom of the box, the transmission apparatus is arranged above the receiving container, the transmission apparatus is provided with the liquid channel, and an outlet of the liquid channel faces the receiving container.

2. The automatic separation apparatus for the four fractions of heavy oil according to claim 1, further comprising:
   a sample loading apparatus arranged between the filter disc and the solvent reservoir tank; and
   a pump arranged between the solvent reservoir tank and the sample loading apparatus.

3. The automatic separation apparatus for the four fractions of heavy oil according to claim 1, wherein the splitter comprises one inlet and n outlets; and
   wherein the one inlet of the splitter serves as a liquid inlet end, and respective outlets of the splitter are in communication with respective inlets of the metal pipes in a one-to-one correspondence.

4. The automatic separation apparatus for the four fractions of heavy oil according to claim 3, wherein the splitter comprises at least one multi-way pipe with three or more ways;
   wherein the multi-way pipe has branch pipes with equal inner diameters and equal total lengths; and
   wherein the metal pipes have inner diameters of 0.05 mm to 0.5 mm and length-to-diameter ratios of 5000:1-50000:1.

5. The automatic separation apparatus for the four fractions of heavy oil according to claim 3, wherein the liquid splitting apparatus further comprises:
   a fixing element that is a metal sheet with a plurality of grooves;
   wherein the metal sheet is arranged on the heating element; and
   wherein each of the metal pipes is wound on the fixing element in sections.

6. The automatic separation apparatus for the four fractions of heavy oil according to claim 1, further comprising:
   a column oven;
   wherein the separation unit for the four fractions of heavy oil is provided inside the column oven; and
   wherein a heater and a fan are further provided inside the column oven with the fan being placed behind the heater.

7. The automatic separation apparatus for the four fractions of heavy oil according to claim 1, wherein the filter disc is provided with a layer of filter membrane or multi layers of filter membranes; and
   wherein the filter membrane or the filter membranes has a pore size of 0.1 μm-100 μm.

8. The automatic separation apparatus for the four fractions of heavy oil according to claim 1, wherein a packing material of the chromatographic column is alumina having a specific surface area of 150 $m^2$/g to 200 $m^2$/g and a pore volume of 0.25 mL/g to 0.35 mL/g;
   wherein a mass of the alumina having a particle size of 60 microns-200 microns accounts for 60%-80% of a total mass of the packing material;
   wherein an amount of the alumina is not less than 20 g/g of a sample of the heavy oil; and
   wherein a column layer after packing of the alumina has a height-to-diameter ratio of not less than 5:1, and a density of not less than 0.8 g/$m^3$.

9. The automatic separation apparatus for the four fractions of heavy oil according to claim 1,
   wherein the receiving apparatus comprises a heating component arranged on an outer surface of the receiving container;
   wherein the receiving apparatus comprises a vent hole opened on top of the box; and
   wherein the receiving container has a thickness of 0.1 mm-1 mm and a capacity of 10 mL-50 mL.

10. A separation method for the four fractions of heavy oil, applied in the automatic separation apparatus for four fractions of heavy oil according to claim 1, comprising the following steps of:
    S1: adding the heavy oil dispersed with a first solvent into the separation unit for four fractions of heavy oil, the heavy oil flowing through the filter disc and the chromatographic column sequentially, and using the first solvent to flush the separation unit for the four fractions of heavy oil, to obtain a saturates eluent;
    S2: switching the pre-column flow path switching valve and the post-column flow path switching valve, adding a second solvent into the separation unit for the four fractions of heavy oil for flushing, and the second solvent flowing through the filter disc and the bypass pipeline sequentially, to obtain an asphaltenes eluent;

S3: switching the pre-column flow path switching valve and the post-column flow path switching valve, adding the second solvent into the separation unit for the four fractions of heavy oil for flushing, and the second solvent flowing through the filter disc and the chromatographic column sequentially, to obtain an aromatics eluent; and S4: adding a third solvent, the second solvent, and a fourth solvent sequentially into the separation unit for the four fractions of heavy oil for flushing, to obtain a resins eluent, and using the receiving apparatus to collect eluents respectively obtained in S1-S4.

11. The separation method for the four fractions of heavy oil according to claim 10, further comprising a step of S5: removing a solvent from the collected eluent for each fraction, to obtain separated four fractions of heavy oil.

12. The separation method for the four fractions of heavy oil according to claim 10, wherein boiling points of the first solvent, the second solvent, the third solvent, and the fourth solvent are lower than 150° C.

13. The separation method for the four fractions of heavy oil according to claim 12, wherein:
the first solvent is an organic solvent capable of dissolving saturates, aromatics, and resins;
the second solvent is an organic solvent capable of dissolving asphaltenes and aromatics;
the third solvent is a mixed solvent composed of aromatics hydrocarbon and monohydric alcohol in a volume ratio of 0.5-2; and
the fourth solvent is a monohydric alcohol.

14. The separation method for the four fractions of heavy oil according to claim 10, wherein in the step of S1, an amount of heavy oil corresponding to each gram of packing material of the chromatographic column is not more than 0.05 g.

15. The separation method for the four fractions of heavy oil according to claim 10, wherein in the step of S1, a volume of the first solvent for dispersing the heavy oil is 1-10 times a volume of the heavy oil, and a volume of the first solvent for flushing the filter disc is not less than 100 times the volume of the heavy oil.

16. The separation method for the four fractions of heavy oil according to claim 10, wherein in the step of S2, a volume of the second solvent for flushing the filter disc is not less than 100 times a volume of the heavy oil.

17. The separation method for the four fractions of heavy oil according to claim 10, wherein in the step of S3, a volume of the second solvent for flushing the chromatographic column is 1-10 times a dead volume of the chromatographic column.

18. The separation method for the four fractions of heavy oil according to claim 10, wherein in the step of S4, a volume of the third solvent for flushing the chromatographic column is 1-5 times a dead volume of the chromatographic column, a volume of the second solvent for flushing the chromatographic column is 1-5 times the dead volume of the chromatographic column, and a volume of the fourth solvent for flushing the chromatographic column is 1-5 times the dead volume of the chromatographic column.

* * * * *